United States Patent
Boettcher

(10) Patent No.: US 9,631,659 B2
(45) Date of Patent: Apr. 25, 2017

(54) MULTI-MATERIAL JOINTS AND METHODS

(71) Applicant: Honda Motor Co., Ltd., Minato-ku, Tokyo (JP)

(72) Inventor: Eric J. Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 14/250,350

(22) Filed: Apr. 10, 2014

(65) Prior Publication Data
US 2014/0318687 A1    Oct. 30, 2014

Related U.S. Application Data

(60) Provisional application No. 61/816,477, filed on Apr. 26, 2013.

(51) Int. Cl.
*B25G 3/36* (2006.01)
*F16B 15/00* (2006.01)
(Continued)

(52) U.S. Cl.
CPC ............ *F16B 15/0092* (2013.01); *B32B 7/12* (2013.01); *B32B 15/08* (2013.01); *B32B 15/20* (2013.01);
(Continued)

(58) Field of Classification Search
CPC ......... B32B 15/08; B32B 15/20; B32B 27/12; B32B 27/38; B32B 2262/106;
(Continued)

(56) References Cited

U.S. PATENT DOCUMENTS 2,008,755 A * 7/1935 Ellis .................. E04F 13/04
52/310
2,131,775 A * 10/1938 Waring ............... B65D 51/145
215/250
(Continued)

FOREIGN PATENT DOCUMENTS

CN         1329983 A    1/2002
CN       101678648 A    3/2010
(Continued)

OTHER PUBLICATIONS

Office Action issued in Japanese Patent Application No. 2014-082649; dated May 12, 2015; 3 pages, including translation.
(Continued)

*Primary Examiner* — Gregory Binda
*Assistant Examiner* — Nahid Amiri
(74) *Attorney, Agent, or Firm* — Armstrong Teasdale LLP

(57) ABSTRACT

A multi-material joint includes first and second body members, a staple, a wire ladder, and an adhesive. The first body member includes a first layer of fiber reinforced material which has first upper and lower surfaces. The second body member includes a metal. The staple includes first and second prongs joined by a crown. The first and second prongs are inserted through the first layer such that the crown is positioned adjacent to the first upper surface. The wire ladder is positioned adjacent to the first lower surface and includes first and second rails coupled together by a plurality of rungs. The first and second prongs hook over the respective first and second rungs. The adhesive is positioned between the first and second body members, and covers at least a portion of the crown. Other multi-material joints are also provided, as are methods of making multi-material joints.

37 Claims, 23 Drawing Sheets

(51) Int. Cl.
*B32B 7/12* (2006.01)
*B32B 15/08* (2006.01)
*B32B 15/20* (2006.01)
*B32B 27/38* (2006.01)
*F16B 11/00* (2006.01)

(52) U.S. Cl.
CPC .......... *B32B 27/38* (2013.01); *F16B 15/0015* (2013.01); *B32B 2262/106* (2013.01); *B32B 2307/54* (2013.01); *B32B 2307/714* (2013.01); *B32B 2605/00* (2013.01); *F16B 11/006* (2013.01)

(58) Field of Classification Search
CPC .......... B32B 2307/54; B32B 2307/714; B32B 2605/00; F16B 15/0015; F16B 11/006
USPC ......................................................... 403/403
See application file for complete search history.

(56) References Cited

U.S. PATENT DOCUMENTS

| | | | | |
|---|---|---|---|---|
| 2,742,958 | A * | 4/1956 | Gerber | A47C 7/34 297/452.21 |
| 3,056,594 | A * | 10/1962 | Blackman | C21D 9/54 242/602 |
| 3,170,279 | A * | 2/1965 | Dubini | B21D 53/36 411/442 |
| 3,555,630 | A * | 1/1971 | Wylde | A44B 18/0015 24/447 |
| 3,834,832 | A | 9/1974 | Mallinder et al. | |
| 3,981,425 | A * | 9/1976 | Megumi | B25C 5/0207 227/155 |
| 5,279,876 | A | 1/1994 | Thum | |
| 5,324,307 | A * | 6/1994 | Jarrett | A61B 17/064 525/415 |
| 5,800,672 | A | 9/1998 | Boyce et al. | |
| 6,447,642 | B1 * | 9/2002 | Phan | D21F 11/006 162/109 |
| 6,835,436 | B1 | 12/2004 | Reif et al. | |
| 7,267,682 | B1 * | 9/2007 | Bender | A61B 17/0644 606/151 |
| 7,905,902 | B2 * | 3/2011 | Huitema | A61B 17/0644 606/219 |
| 2004/0028858 | A1 | 2/2004 | Schnell | |
| 2007/0160864 | A1 | 7/2007 | De Ciutiis et al. | |
| 2009/0065484 | A1 | 3/2009 | Wang et al. | |
| 2009/0182352 | A1 | 7/2009 | Paz et al. | |
| 2010/0247869 | A1 | 9/2010 | Meyer et al. | |
| 2011/0097142 | A1 | 4/2011 | Bassler et al. | |
| 2011/0206942 | A1 | 8/2011 | Schiebel et al. | |

FOREIGN PATENT DOCUMENTS

| | | |
|---|---|---|
| CN | 102729544 A | 10/2012 |
| CN | 103057191 A | 4/2013 |
| DE | 10 2004 016 854 | 10/2005 |
| DE | 10 2013 220 575 A1 | 9/2014 |
| JP | 2011506799 A | 3/2011 |

OTHER PUBLICATIONS

English Translation of First Office Action issued in connection with Chinese Application No. 201410316951.X, dated Oct. 21, 2015, 9 pages.

Warren, C. D., et al.; Adhesive Bonding of Polymeric Materials for Automotive Applications; prepared for the Proceedings of the 1994 Annual Automotive Technology Development Contractors Coordination Meeting; Oct. 24-27, 1994; 14 pages; Dearborn, Michigan.

Paulauskas, F. L., et al.; Adhesive Bonding via Exposure to Variable Frequency Microwave Radiation; Spring Materials Research Society (MRS)—Meeting; Apr. 8-12, 1996; 16 pages; San Francisco, California.

Warren, C. D. et al.; DOE Automotive Composite Materials Research: Present and Future Efforts; Abstract Prepared for the Proceedings of the Composites '99 Manufacturing and Tooling Conference; Feb. 1999; 15 pages; Anaheim, California.

Warren, C. D.; Carbon Fiber in Future Vehicles; Sampe Journal; Mar./Apr. 2001; pp. 7-15; vol. 37, No. 2.

English-language translation of German Patent Application Publication No. 10 2004 016 854; dated Oct. 27, 2005; 5 pages. Publication first cited without translation in Information Disclosure Statement dated Jan. 16, 2015.

Schnell, Edith; Examination Report issued in German Patent Application No. 10 2014 207 613.7; Dated Dec. 11, 2014; 5 pages.

Schnell, Edith; Search Report issued in German Patent Application No. 10 2014 207 613.7; Dated Dec. 11, 2014; 8 pages.

* cited by examiner

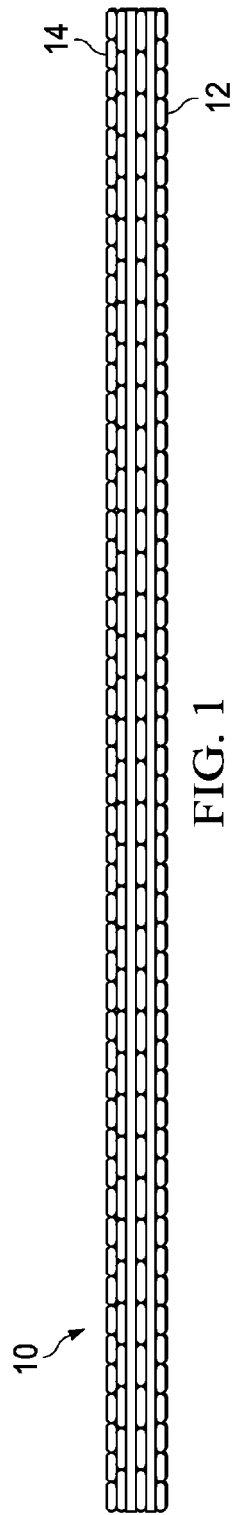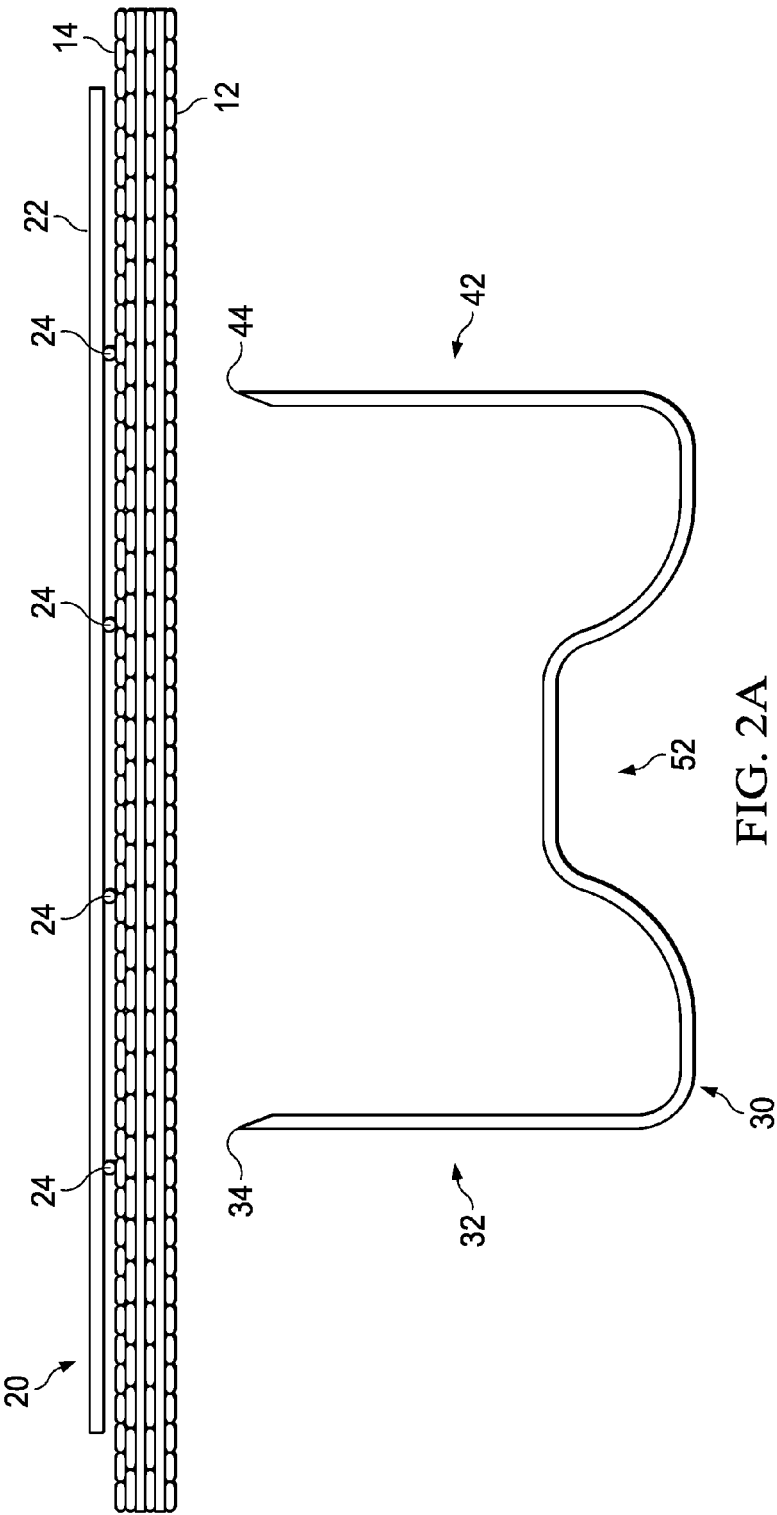

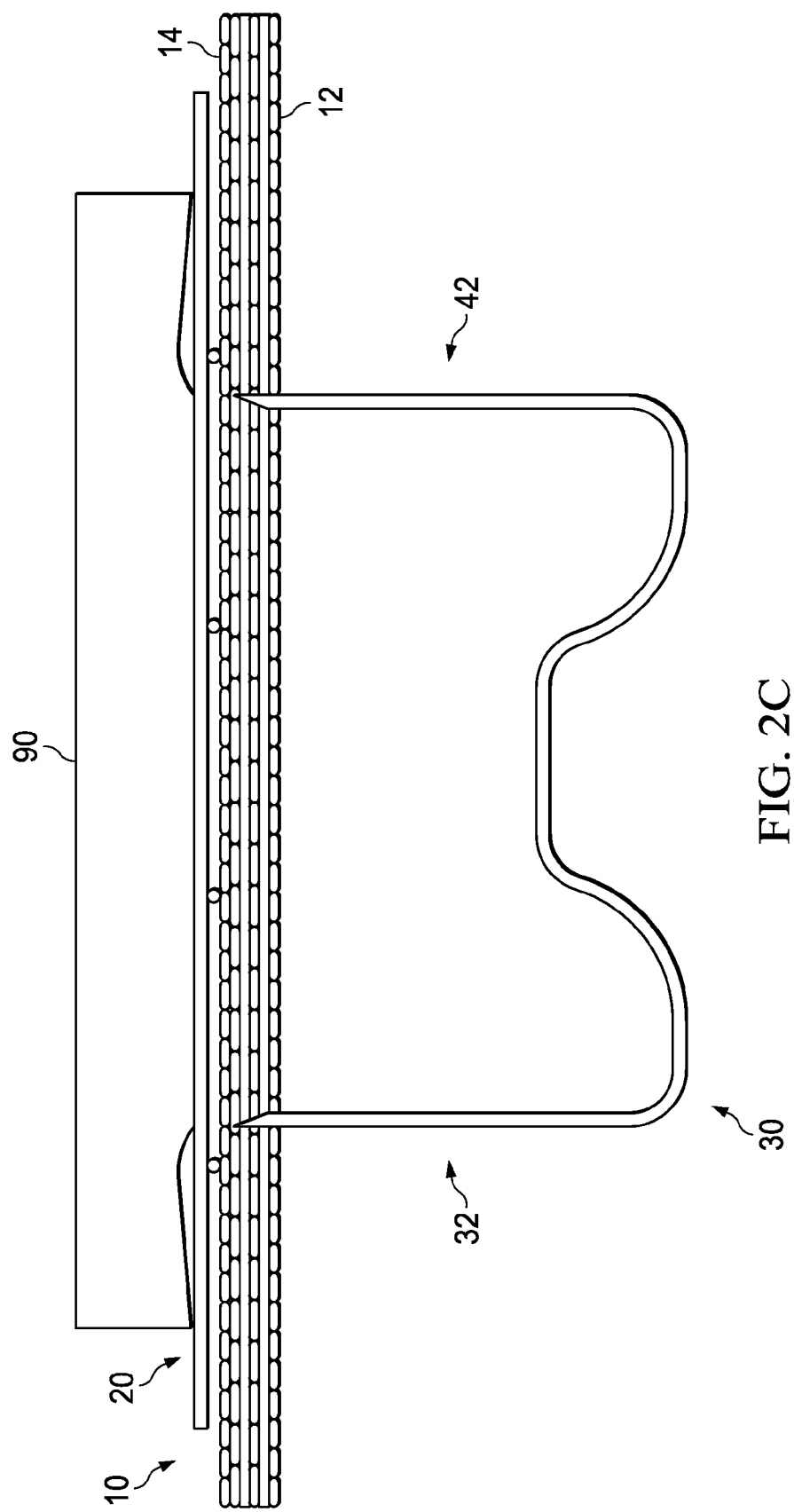

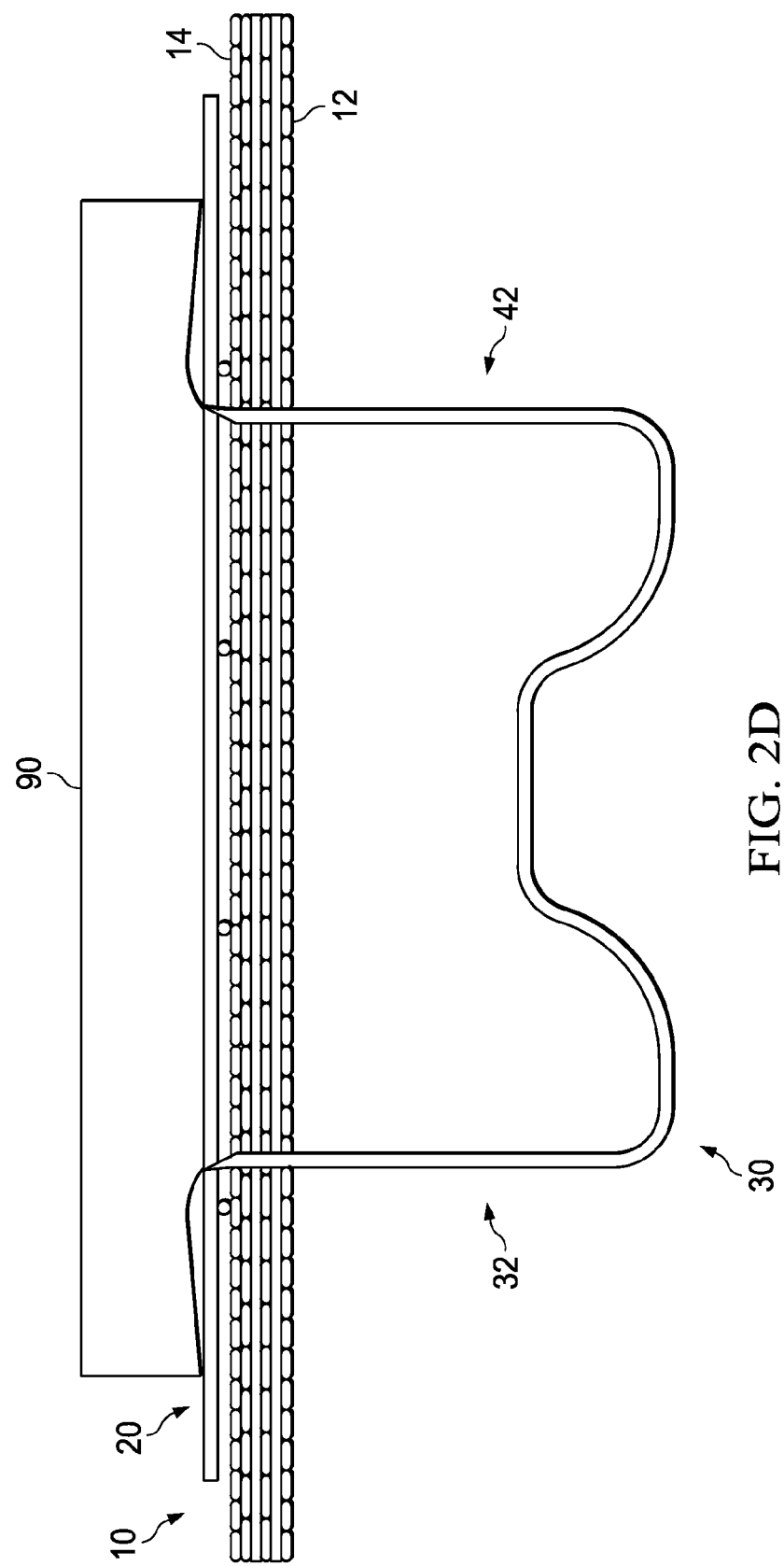

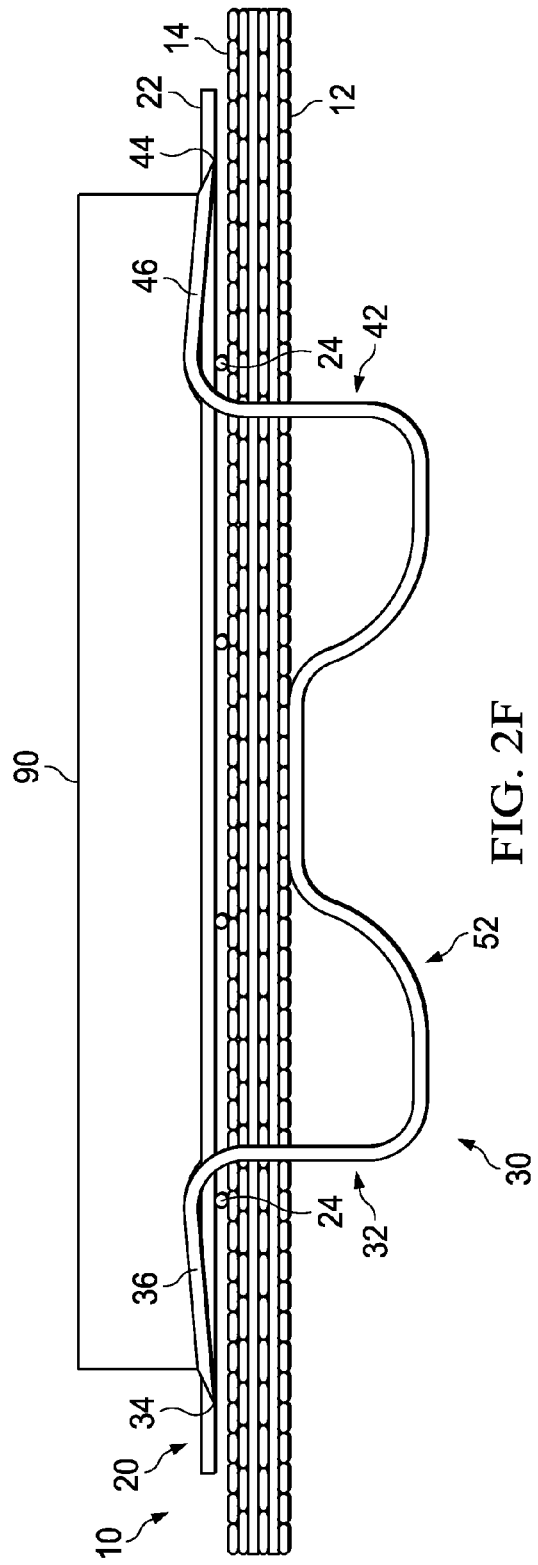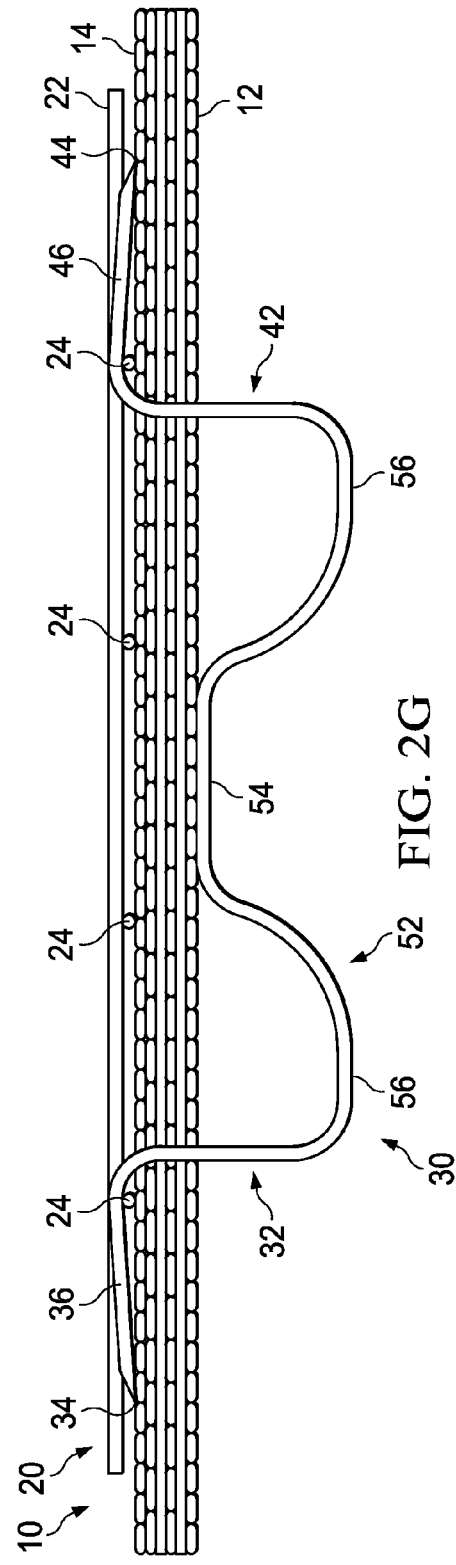

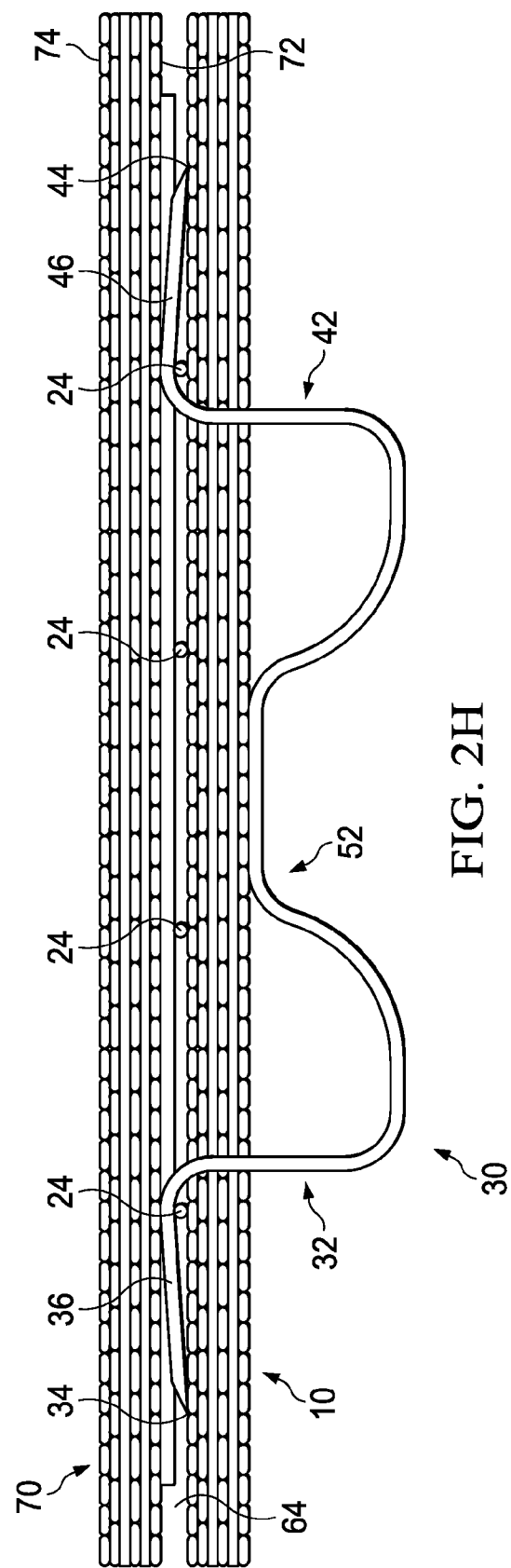

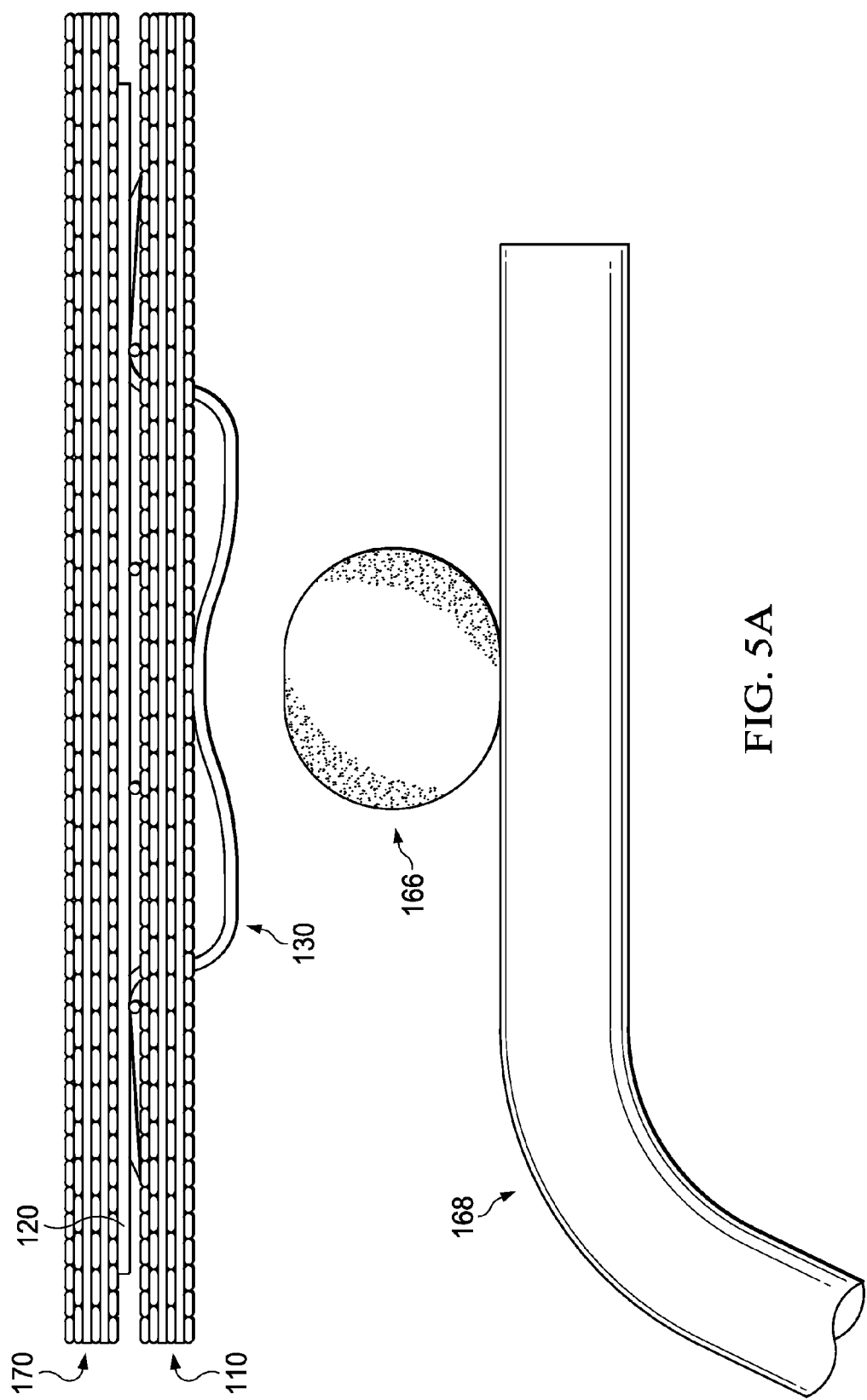

US 9,631,659 B2

MULTI-MATERIAL JOINTS AND METHODS

REFERENCE TO RELATED APPLICATION

This application claims priority of U.S. provisional patent application Ser. No. 61/816,477, filed Apr. 26, 2013, and hereby incorporates this provisional patent application by reference herein in its entirety.

TECHNICAL FIELD

This application relates generally to a multi-material joint such as can be used in a vehicle.

BACKGROUND

Joining dissimilar materials is an important technical barrier to weight reduction of both civilian and military vehicles.

SUMMARY

In accordance with one embodiment, a multi-material joint comprises a first body member, a second body member, a staple, a wire ladder, and an adhesive. The first body member comprises a first layer of fiber reinforced material. The first layer of fiber reinforced material has a first upper surface and a first lower surface. The second body member comprises a metal. The staple comprises a first prong, a second prong, and a crown joining the first and second prongs. The first and second prongs are inserted through the first layer of fiber reinforced material such that the crown is positioned adjacent to the first upper surface. The wire ladder is positioned adjacent to the first lower surface and comprises first and second rails coupled together by a plurality of rungs. The first and second prongs of the staple hook over the respective first and second rungs of the wire ladder. The adhesive is positioned between the first body member and the second body member, and covers at least a portion of the crown of the staple.

In accordance with another embodiment, a method of making a multi-material joint is provided. The method comprises piercing a first layer of fiber reinforced material of a first body member with a staple, such that first and second prongs of the staple pass through the first layer, and such that a crown of the staple is positioned adjacent to an upper surface of the first layer. The method further comprises positioning a wire ladder adjacent to a lower surface of the first layer of fiber reinforced material. The wire ladder comprises first and second rails coupled together by a plurality of rungs. The method additionally comprises bending end portions of the first and second prongs of the staple to hook over the respective first and second rungs of the wire ladder. The method also comprises positioning an adhesive between the first layer and a second body member, such that the adhesive covers at least a portion of the crown of the staple. The second body member comprises a metal.

In accordance with yet another embodiment, a multi-material joint comprises a first body member, a second body member, a reinforcement member, a fastener body, and an adhesive. The first body member comprises a first layer of fiber reinforced material. The first body member has a first surface and a second surface opposite the first surface. The second body member comprises a metal and is positioned opposite the first surface of the first body member. The reinforcement member is positioned adjacent the second surface of the first body member. The fastener body is positioned between the first body member and the second body member to maintain a gap therebetween. The fastener body includes a first leg and a second leg each extending therefrom and through the first body member and the reinforcement member. The first and second legs are configured to position at least a portion of the reinforcement member between the first body member and the first and second legs. The adhesive is positioned in the gap between the first body member and the second body member and contacts at least a portion of the fastener body.

BRIEF DESCRIPTION OF THE DRAWINGS

Various embodiments will become better understood with regard to the following description, appended claims and accompanying drawings wherein:

FIG. 1 is a sectional view depicting a portion of a first layer of a fiber reinforced material, in accordance with one embodiment;

FIGS. 2A-2H are sectional views depicting associating and crimping a staple with respect to the first layer of FIG. 1, and other components, in accordance with one embodiment;

FIGS. 5A-5B are sectional views depicting use of an arrangement to complete a multi-material joint, in accordance with another embodiment;

DETAILED DESCRIPTION

Certain embodiments are hereinafter described in detail in connection with the views and examples of FIGS. 1, 2A-2H, 3A-3C, 4A-4H, 5A-5B, 6A-6C, and 7, wherein like numbers refer to like elements throughout the views.

A staple can be used to facilitate attachment of first and second body members which differ from one another in composition, to provide a multi-material joint, as discussed below, on an automobile or other vehicle, equipment, or other item. In one embodiment, the first body member can comprise first and second layers of fiber reinforced material. The fiber reinforced material can include a carbon fiber reinforced material or a fiber reinforced plastic (FRP). In one embodiment, FRP includes a matrix material that substantially encapsulates a fiber material. The matrix material can be an epoxy resin that is relatively weak compared to a much stronger fiber material that has significant tensile properties. When carbon fibers are used, FRP becomes carbon-fiber-reinforced polymer (CFRP). Carbon fibers have very high tensile strength, but use resin matrix for strength in other load cases. In addition, the anisotropic properties of fiber materials can be balanced with different fiber orientations that are loaded through force transfer throughout the matrix.

The second body member can comprise a component of a vehicle or other equipment or item, and can be formed from metal, such as aluminum (e.g., an aluminum alloy), for example. In one embodiment, the second body member can comprise a 6000 series aluminum alloy. As a lightweight metal, aluminum can facilitate weight reduction in automotive structures. With a lower density compared with steel, however, aluminum involves several concerns with respect to fatigue, ultimate strength, and corrosion.

Figure 4A:
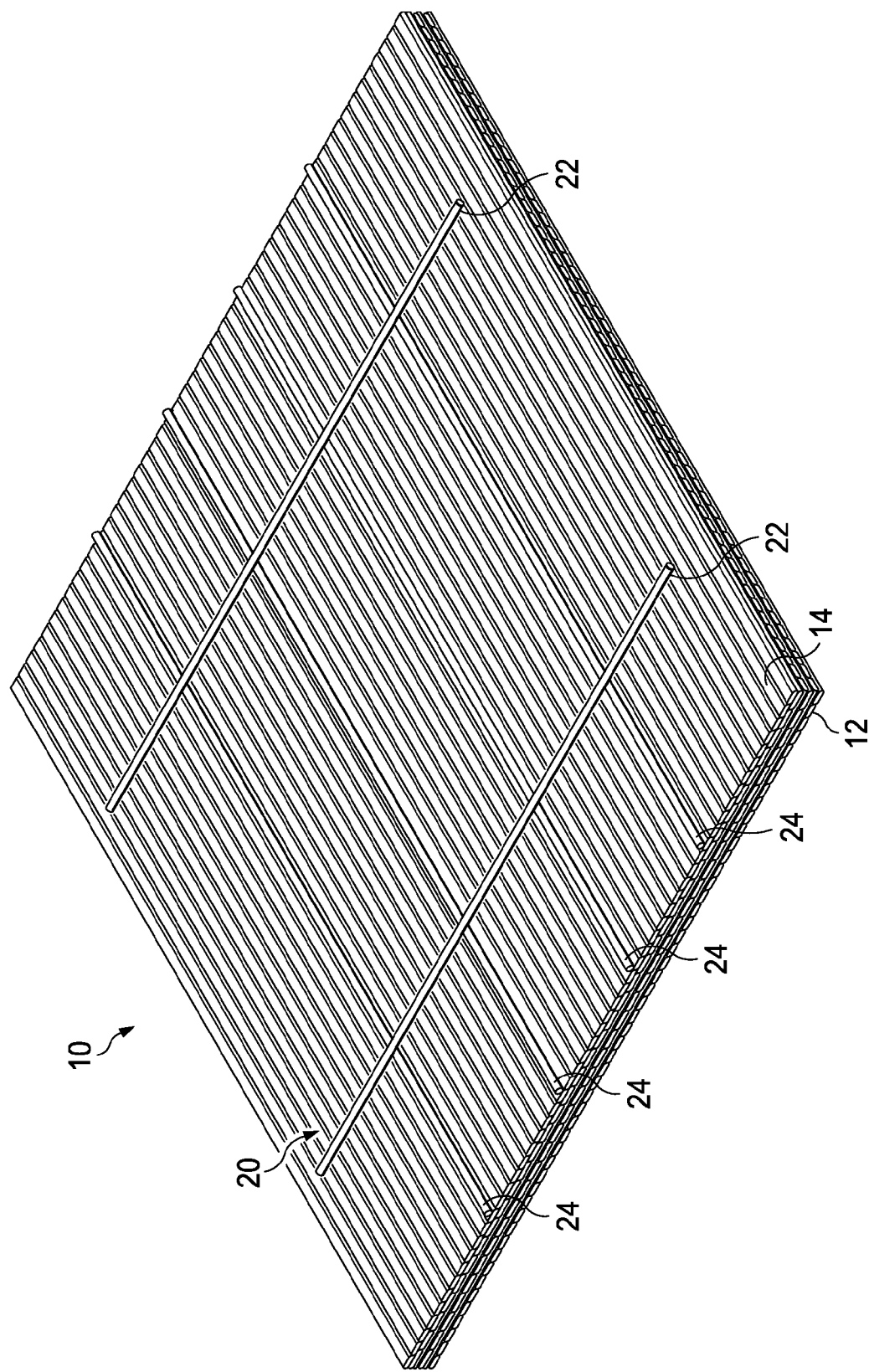
FIGS. 4A-4H are perspective views corresponding with various ones of FIGS. 2A-2G.
Figure 4B:
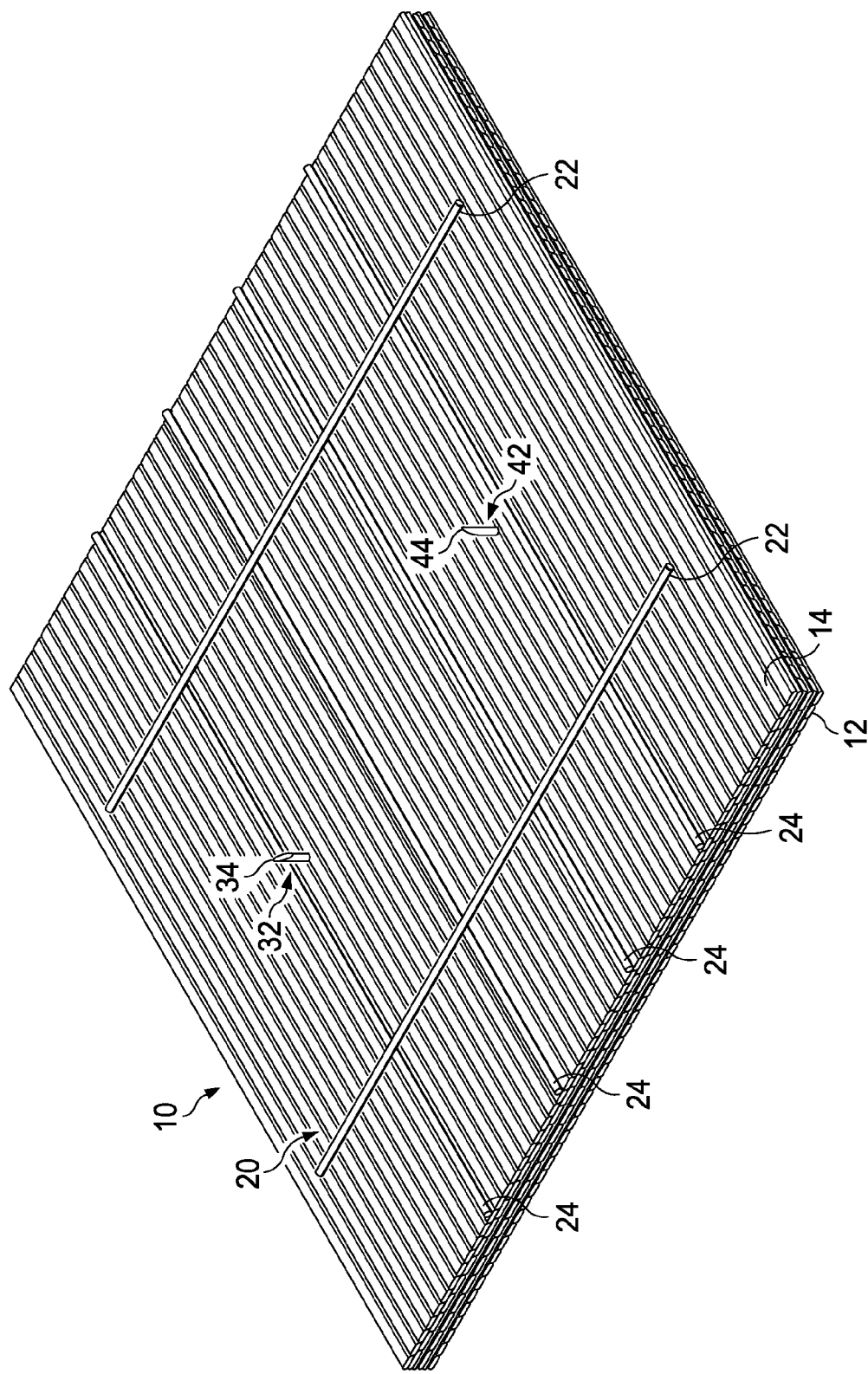
Figure 4C:
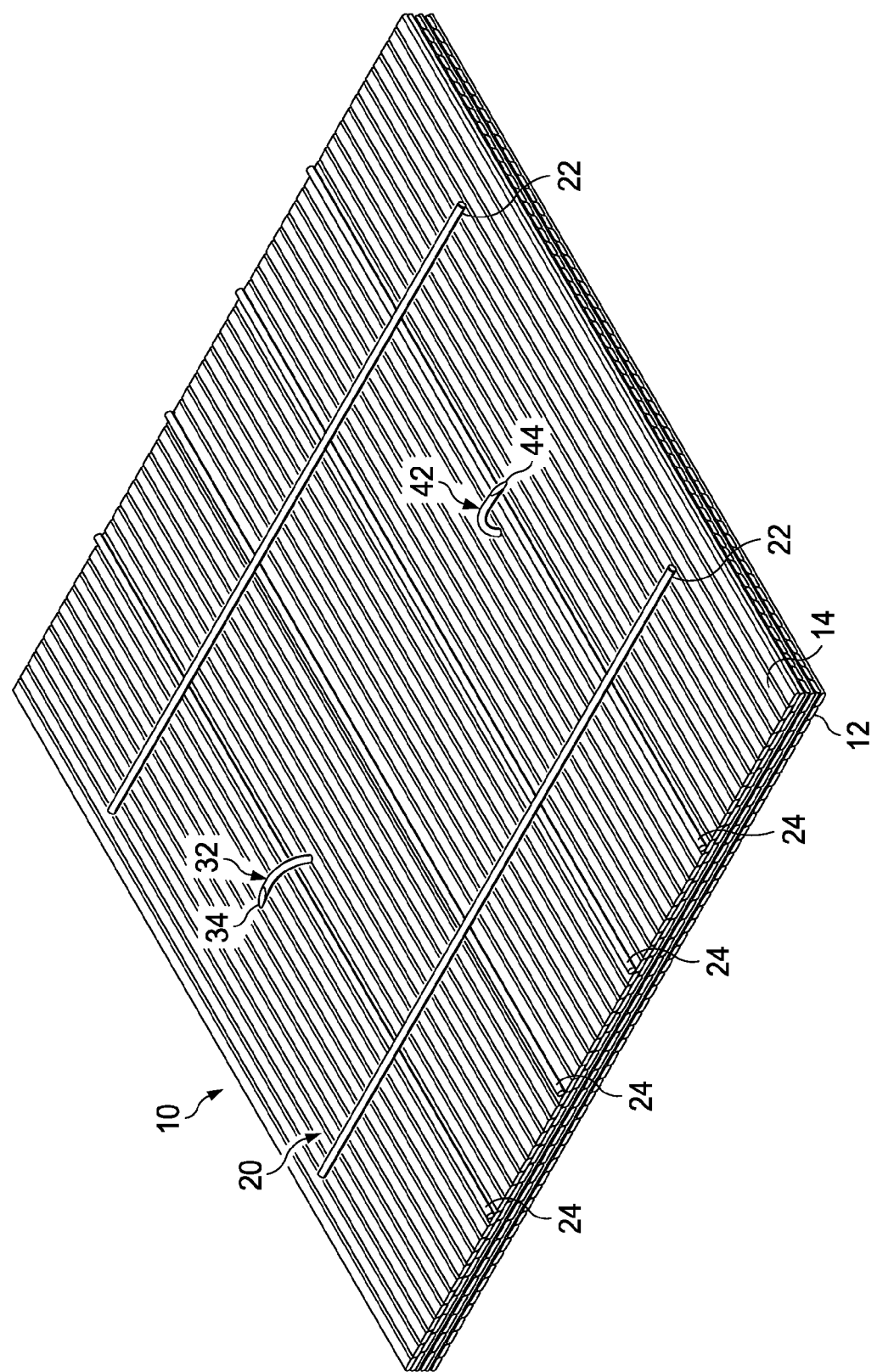
Figure 4D:
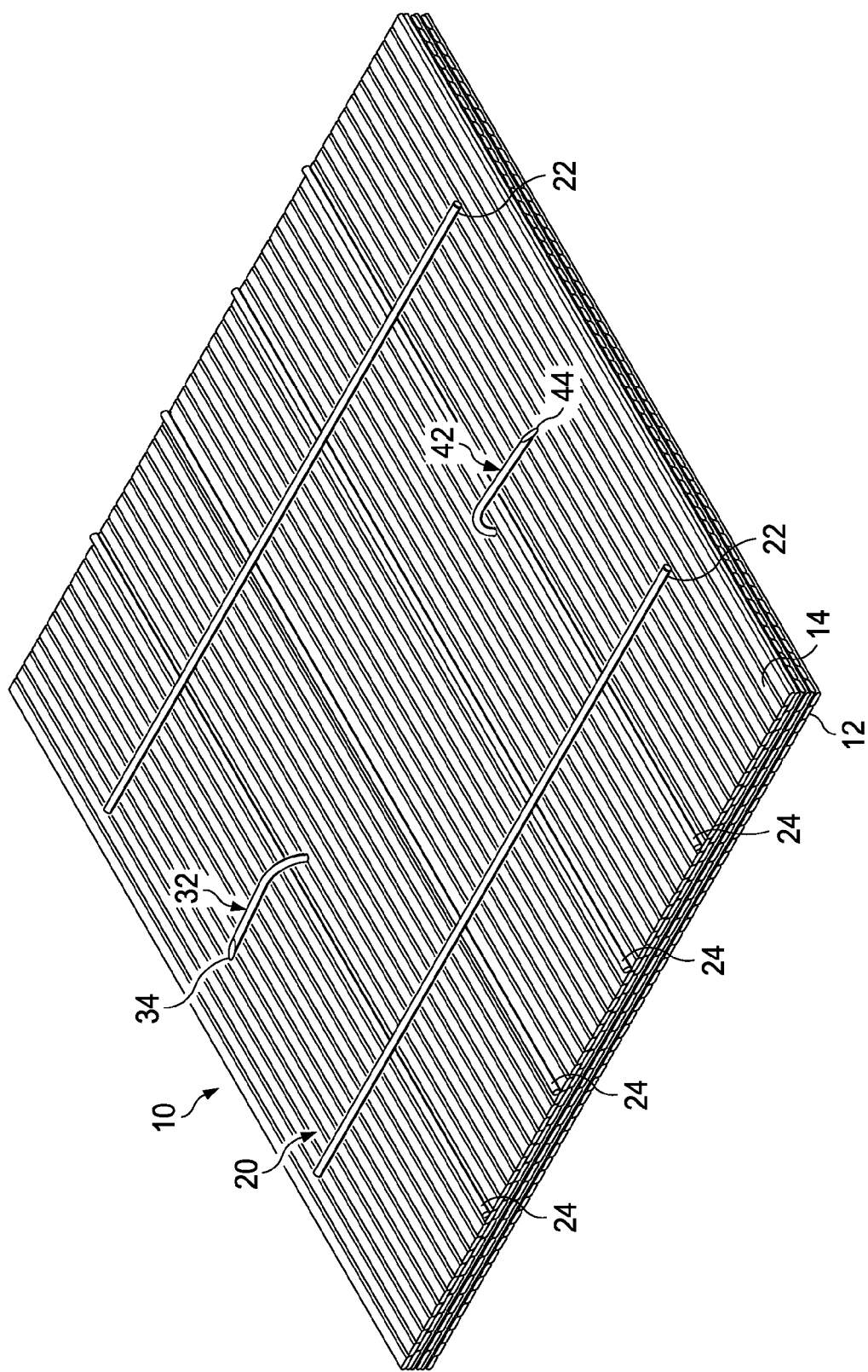
Figure 4E:
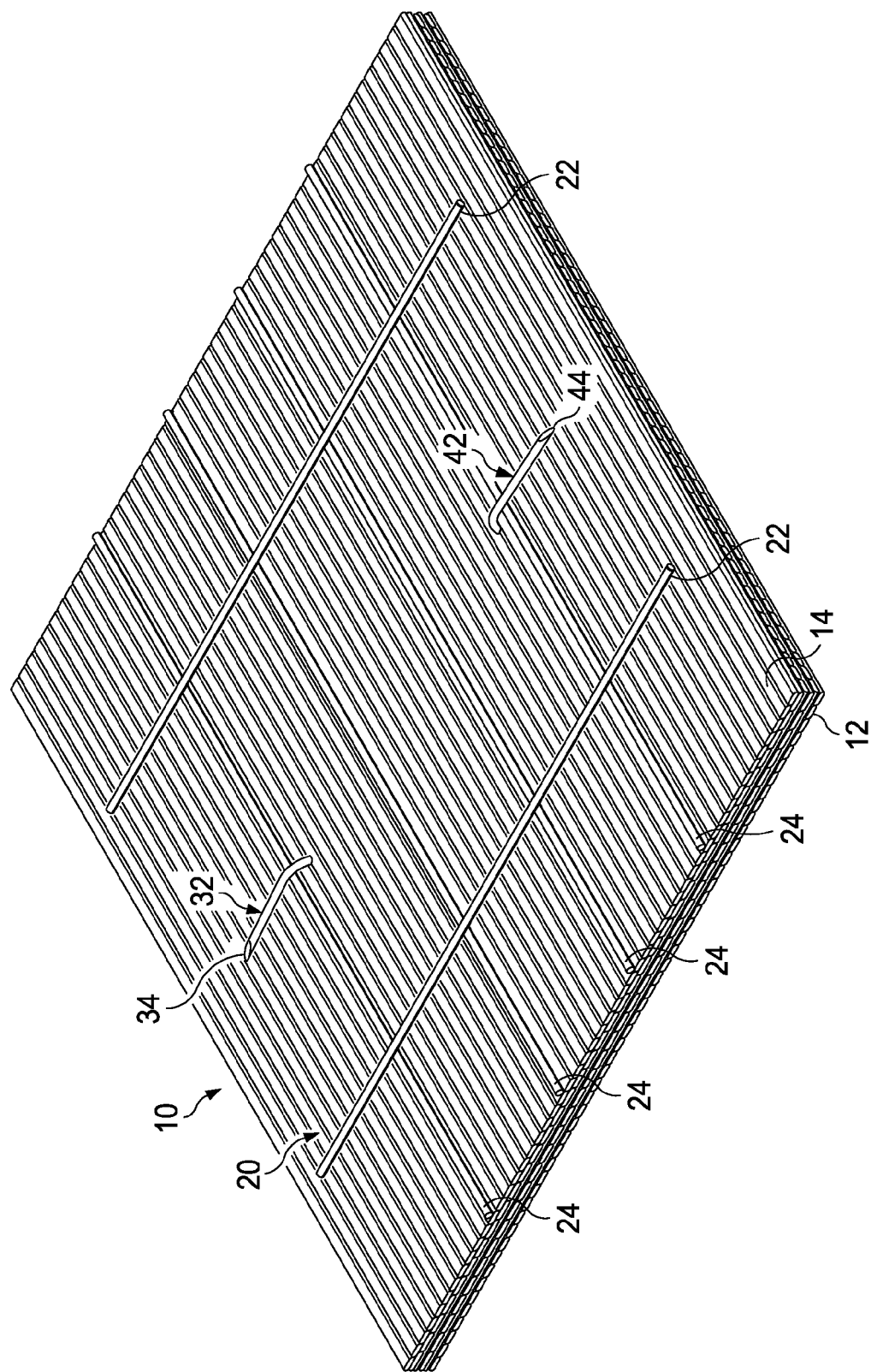
Figure 4F:
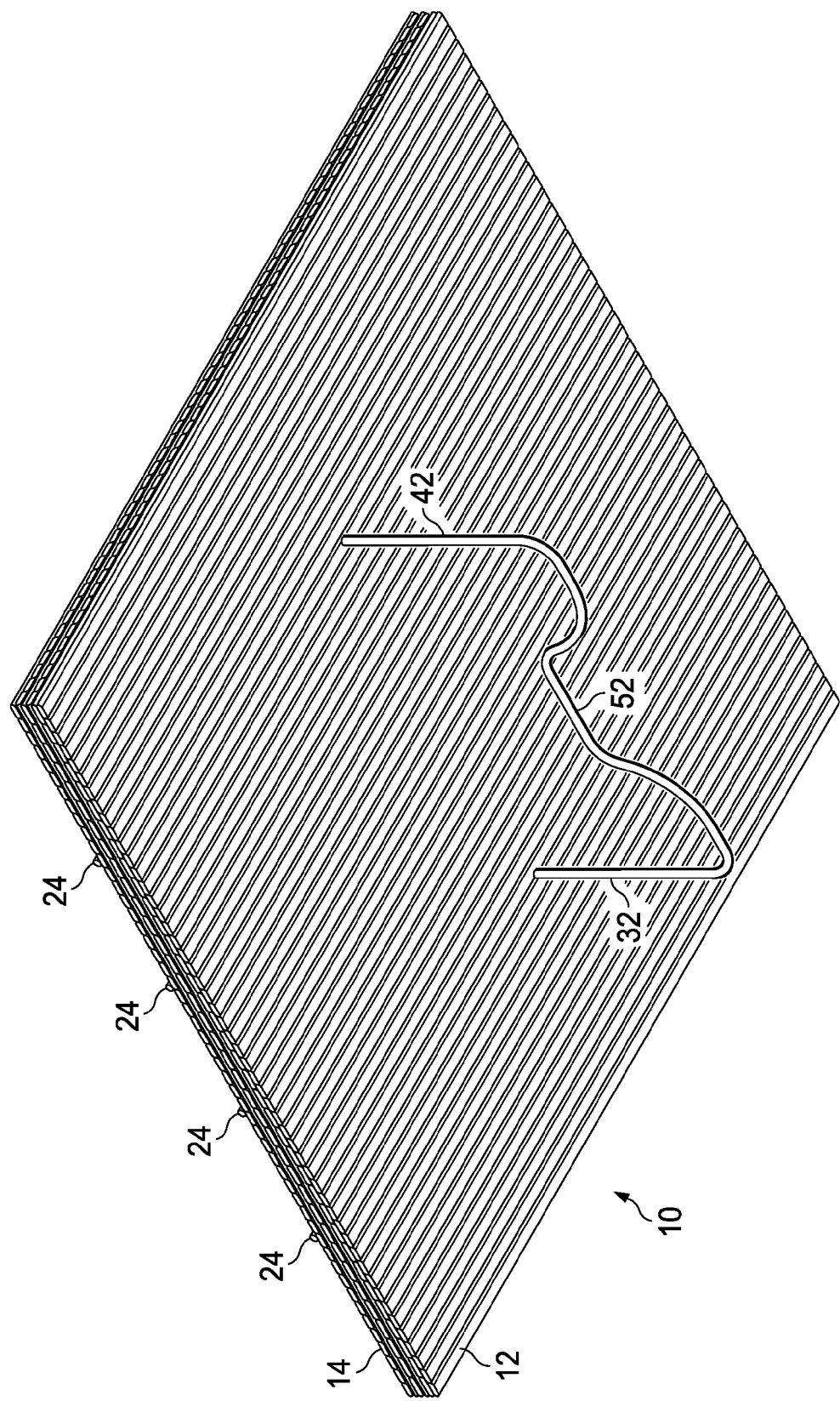
Figure 4G:
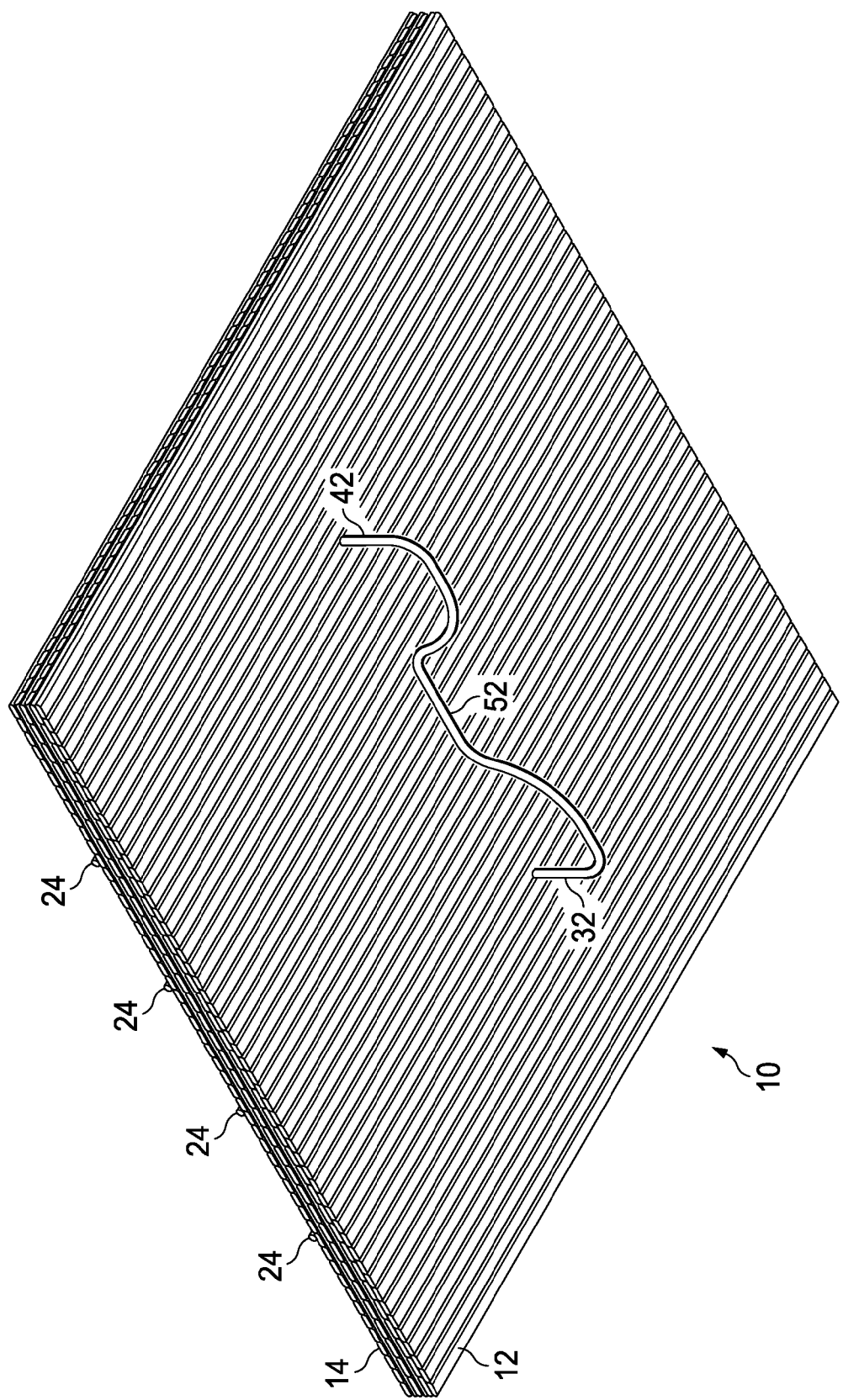
Figure 4H:
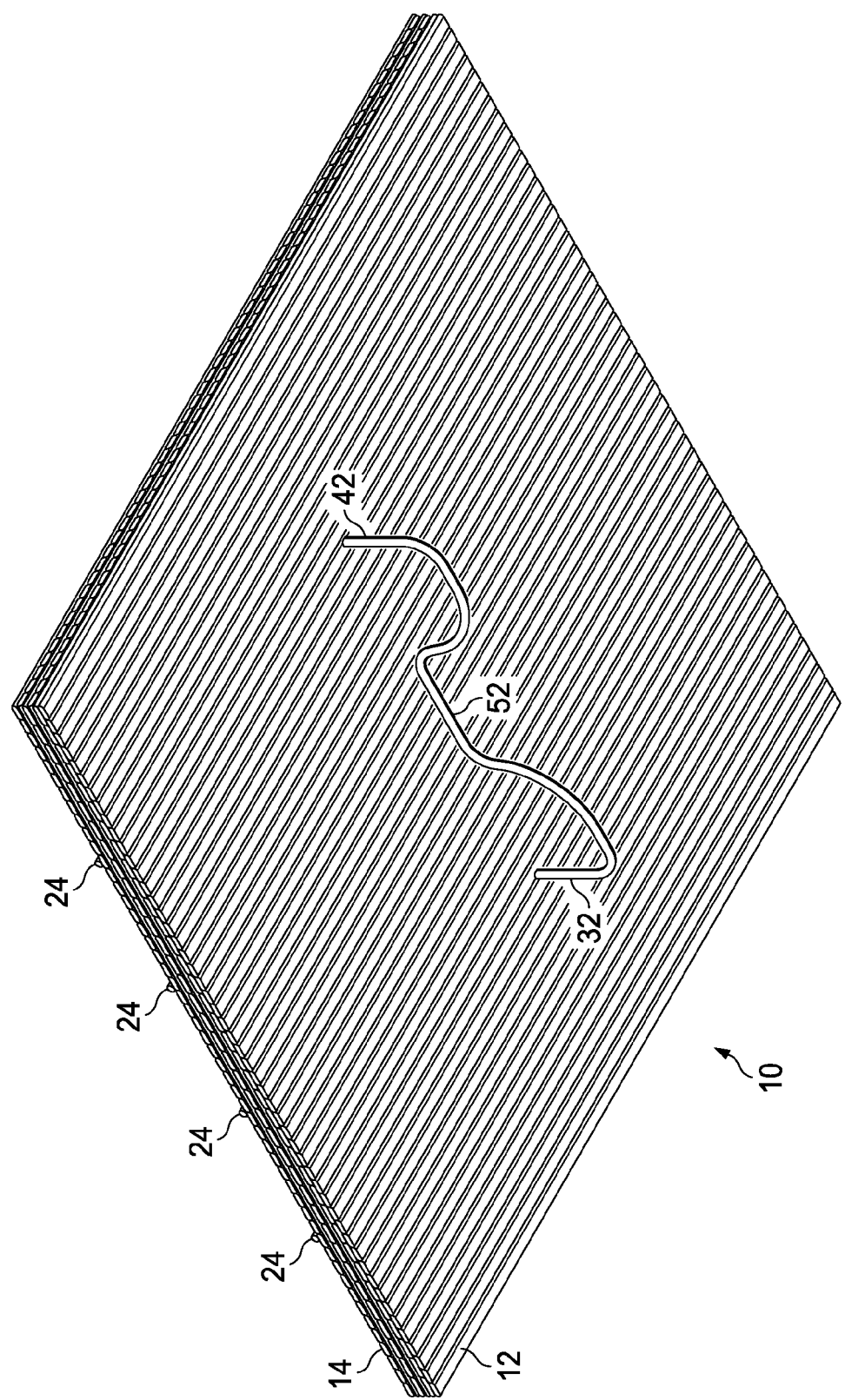

A portion of a first layer 10 of a fiber reinforced material is shown in the sectional view of FIG. 1 and the bottom perspective view of FIG. 4A. In one embodiment, the first layer 10 can comprise CFRP dry fabric having a thickness of about 1.2 mm, and can itself include six sub-layers (e.g., 0, 45, 90, −45, 90, 0). The first layer 10 is shown to have an upper surface 12 and a lower surface 14. It will be appreciated that "upper" and "lower" are used herein to identify opposite surfaces of a layer, though do not necessarily require any particular horizontal or vertical orientation of the layer.

Turning now to the section view of FIG. 2A and the bottom perspective view of FIG. 4A, a wire ladder 20 is shown to be positioned adjacent to the lower surface 14 and to include at least two rails (e.g., 22) coupled together by a plurality of rungs (e.g., 24). The wire ladder 20 can be formed from metal such as steel. FIG. 2A illustrates a staple 30 in spaced association with the first layer 10, in a desired alignment with the upper surface 12 of the first layer 10. The staple 30 is shown in FIG. 2A to include a first prong 32, a second prong 42, and a crown 52 joining the first and second prongs 32 and 42. The first prong 32, the second prong 42, and the crown 52 can be formed together as a unitary structure, e.g., from metal wire, as also shown in FIG. 2A. The first prong 32 can include a first prong end 34, and the second prong 42 can include a second prong end 44. In one embodiment, the first and second prong ends 34 and 44 can be beveled, as shown in FIG. 2A. It will be appreciated that a staple can have any of a variety of configurations other than that shown in FIG. 2A. When the staple 30 is in an unfastened configuration, such as shown in FIG. 2A, each of the first prong 32 and the second prong 42 can be substantially parallel with one another. In one embodiment, the staple 30 can be formed from metal, such as steel, stainless steel, aluminum, or a metal alloy, for example. A coating can be provided on one or more of the first prong 32, the second prong 42, and the crown 52 such as to prevent corrosion and/or to facilitate effective interaction with adhesive and/or imbedding (discussed below). The staple 30 can be formed through any of a variety of suitable processes such as, for example, a wire bending and cutting process.

Figure 2B:
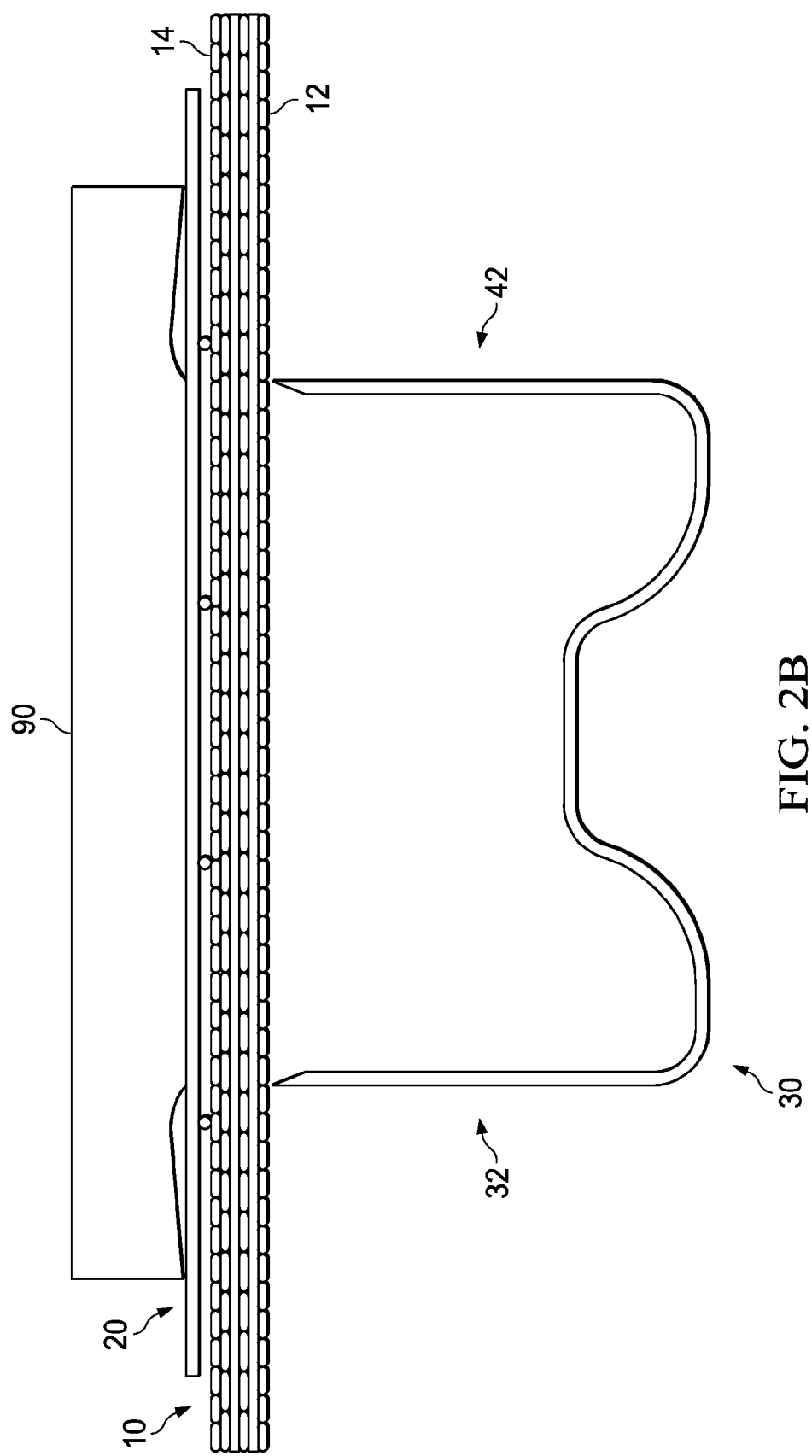

The staple 30 can then be moved from the position in FIG. 2A, such that the first and second prongs 32 and 42 can be near the first layer 10 of the fiber reinforced material, as shown in FIG. 2B. Staple tooling can then be moved in to facilitate crimping of the staple 30, as shown with reference to the section views of FIGS. 2B-2F. More particularly, a die 90 can then be positioned adjacent to the wire ladder 20 and the lower surface 14, as also shown in FIG. 2B. The die 90 can comprise a matched forming die, designed for this specific process. Further movement of the staple 30 can result in the first and second prongs 32 and 42 passing into the first layer 10 as shown in FIG. 2C, and then eventually through the first layer 10 (see the bottom perspective view of FIG. 4B, with the die 90 not shown) and into contact with the die 90 as shown in FIG. 2D. The wedge geometry resulting from the bevel of each of the first and second prong ends 34 and 44 can laterally displace fibers of the first layer 10, rather than cut or damage the fibers, thus minimizing or avoiding damage to the fibers.

Figure 2E:
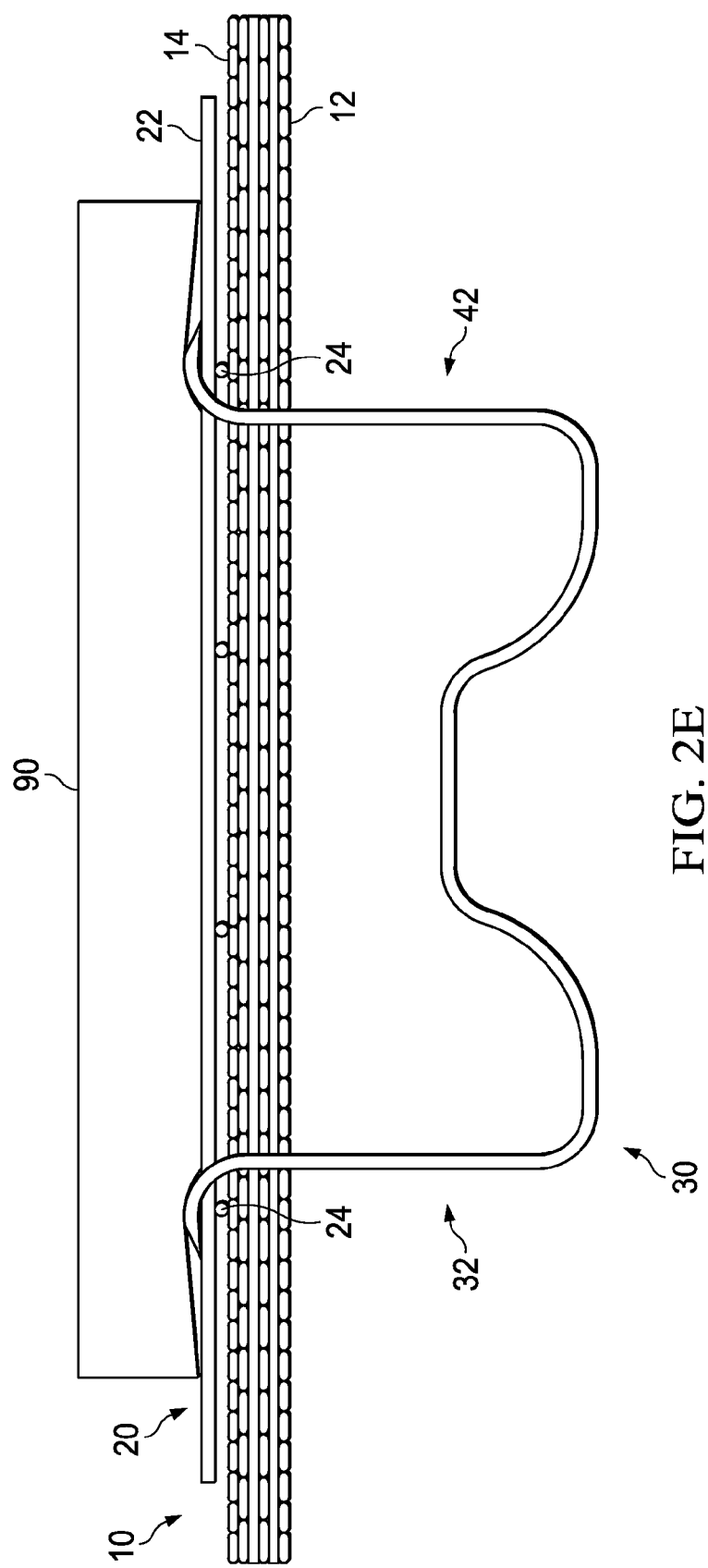

Still further movement of the staple 30 can result in the first and second prongs 32 and 42, through contact with the die 90, beginning to bend to hook over respective rungs 24 of the wire ladder 20, as shown in FIG. 2E. This can also be seen in the bottom perspective view of FIG. 4C (with the die 90 not shown) and in the upper perspective view of FIG. 4F.

FIG. 2F illustrates the staple 30 being fully inserted and under compression against the die 90, with the first and second prongs 32 and 42 being fully bent and hooked over the respective rungs 24, and with the crown 52 positioned adjacent to and in contact with the upper surface 12 of the first layer 10. This can also be seen in the bottom perspective view of FIG. 4D (with the die 90 not shown) and in the upper perspective view of FIG. 4G. In the condition shown in FIG. 2F, the first and second prongs 32 and 42 are shown to be spaced from the rungs 24. These small gaps between the bent staple 30 and the wire ladder 20 can be important for pre-loading the staple 30 firmly into position.

When the die 90 is removed, as shown in the section view of FIG. 2G, the crown 52 of the staple 30 can deflect such that the first and second prongs 32 and 42 contact the rungs 24, a central portion 54 of the crown 52 contacts the upper surface 12 of the first layer 10, and side portions 56 of the crown 52 are spaced from the upper surface 12 of the first layer 10. This can also be seen in the bottom perspective view of FIG. 4E and in the upper perspective view of FIG. 4H. With the die 90 removed, the staple 30 can "spring-back" to stress relieve to a less deformed condition. This can result in positive contact between the staple 30 and the rungs 24, thus facilitating position orientation and position control, and the staple 30 being tightly secured or "stapled" to the first layer 10. Wire material properties and geometry of the staple 30 can be selected in order to avoid plastic deformation of the staple 30 during the insertion process. The wire ladder 20 can control the shape of the first and second prongs 32 and 42 of each staple 30, and can join each staple 30 with the entire composite structure, to integrate and distribute loads throughout the composite structure. Bearing "stress" from the staple 30 can accordingly be distributed into the wire ladder 20, and the wire ladder 20 can facilitate even and thoroughly distributed load transfer from the joint throughout the composite substrate, reducing local stress sensitivity. The die 90 can be designed using computer aided engineering so that the staple 30 will smoothly curve over the wire ladder 20 and then curve with the resulting end portions 36 and 46 being nearly parallel to the plane of the first layer 10, as shown in FIGS. 2F-2H. The die 90 can also control the curvature of the center of the staple 30.

A second layer 70 of fiber reinforced material of the first body member can then be positioned adjacent to the wire ladder 20, as shown in the section view of FIG. 2H. More particularly, the second layer 70 can include an upper surface 72 and a lower surface 74, with the upper surface 72 being adjacent to the wire ladder 20. The second layer 70 can also comprise CFRP, e.g., of a type the same as the first layer 10. In this configuration, the wire ladder 20 and end portions 36 and 46 of the respective first and second prongs 32 and 42 of the staple 30 can be embedded or sandwiched (in a space 64) between the first layer 10 and the second layer 70, as shown in FIG. 2H. Resin can then be injected over the first and second layers 10 and 70 and allowed to cure, prior to taking any further steps. However, the resin is not shown in FIG. 2H, or in FIGS. 3A-3C discussed below, for clarity of illustration. It will be appreciated that in alternative embodiments, resin can be applied and cured earlier or later in the process described herein. While this example depicts an uncured composite/resin system, it will be appreciated that other variations can facilitate use of cured systems.

Due to portions of the first and second prongs 32 and 42 residing in the space 64, it is possible that the space 64 could be a "resin rich" zone. In order to prevent or reduce the likelihood that this zone will present a weak band in the composite layering, additional fiber materials can be added to the wire ladder 20 to reduce the resin rich zone and help stress flow between the first and second layers 10 and 70. Any additional fiber material can be accomplished such that the fully installed staple 30 would not bare directly onto the fiber, potentially causing 'after process' slipping and possible early fiber damage or breakage once loaded.

Figure 3A:
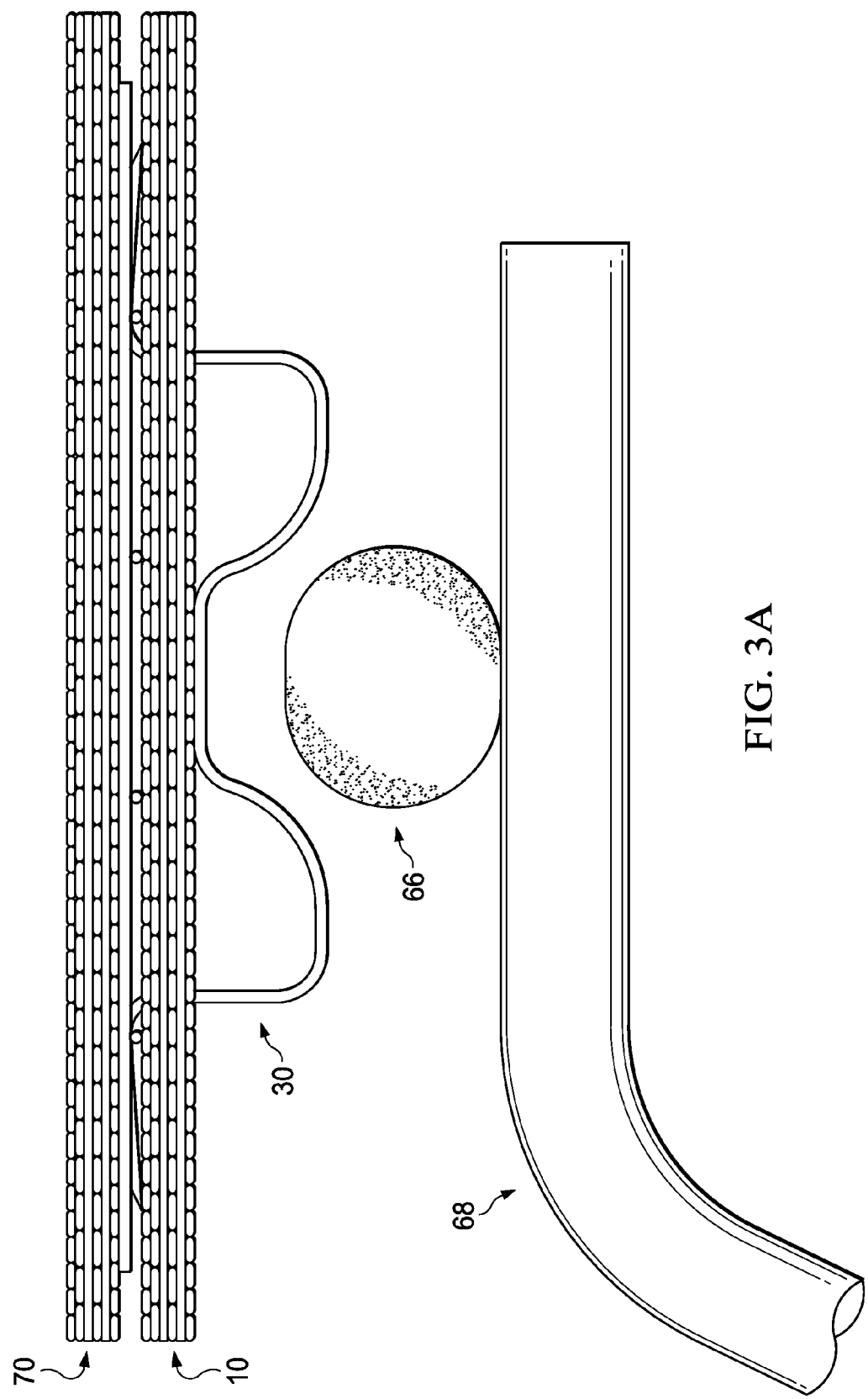
FIGS. 3A-3C are sectional views depicting use of the arrangement of FIG. 2H to complete a multi-material joint, in accordance with one embodiment.
Figure 3B:
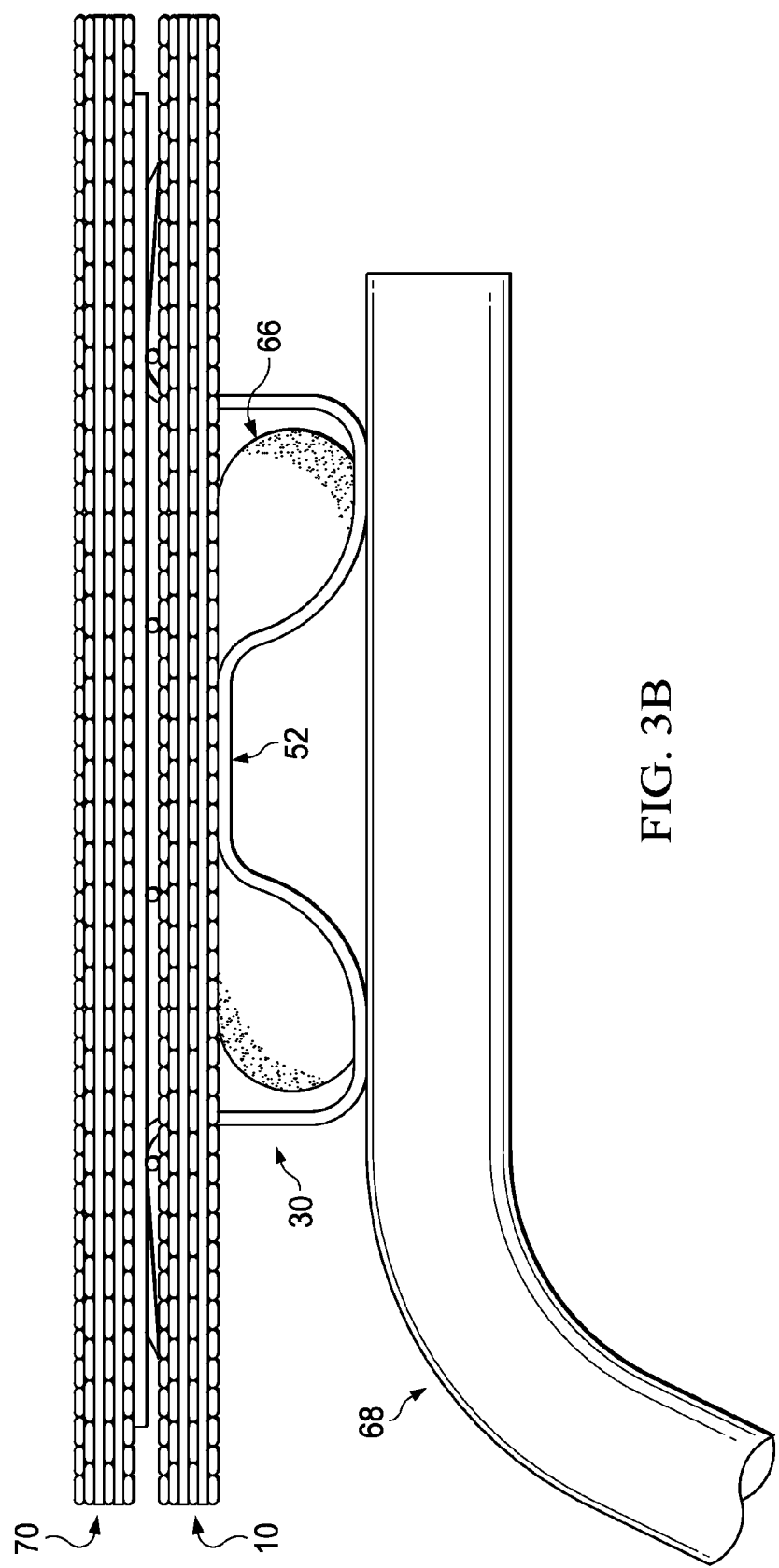

An adhesive 66 can be applied to a second body member 68, such as a frame component of a vehicle, for example (e.g., formed from aluminum), as shown in FIG. 3A. The adhesive 66 can be applied in a gel state, for example, prior to curing. The staple 30 can then be positioned such that the crown 52 of the staple 30 passes through the adhesive 66 and contacts the second body member 68, as shown in FIG. 3B. The manner and degree to which the staple 30 has been crimped or deformed in the preceding steps can provide the staple 30 with a fixed staple profile that establishes and controls the bondline thickness of the adhesive 66 to be used in bonding operations described below. Accordingly, the bondline thickness of the adhesive 66 can be tightly controlled by the geometry of the crown 52 of the staple 30, resulting in the joints being "self-fixturing". The staple 30 can avoid sharp interfaces existing in conventional composite/metal joints, thus reducing Mode I fracture sensitivity. In one embodiment, the adhesive layer can have reinforcements protruding into them from the composite (e.g., the first layer 10). In another embodiment, the layers (e.g., 10, 70) of the composite can be pinned together to reduce sensitivity to interlaminar shear.

The adhesive 66 can cover at least a portion of the crown 52 of the staple 30. In this configuration, the adhesive 66 can be positioned between the second body member 68 and the first layer 10. The unique shape of the staple 30 can help insure that the ideal adhesive thickness is achieved once the staple 30 contacts the second body member 68, improving consistency in joint performance. The adhesive 66 can be selected to achieve an acceptable quality of bonding to both the second layer 70 and the second body member 68. The adhesive 66 can also provide an insulating layer to reduce or prevent galvanic corrosion, which is a leading concern for dissimilar material joints.

Figure 3C:
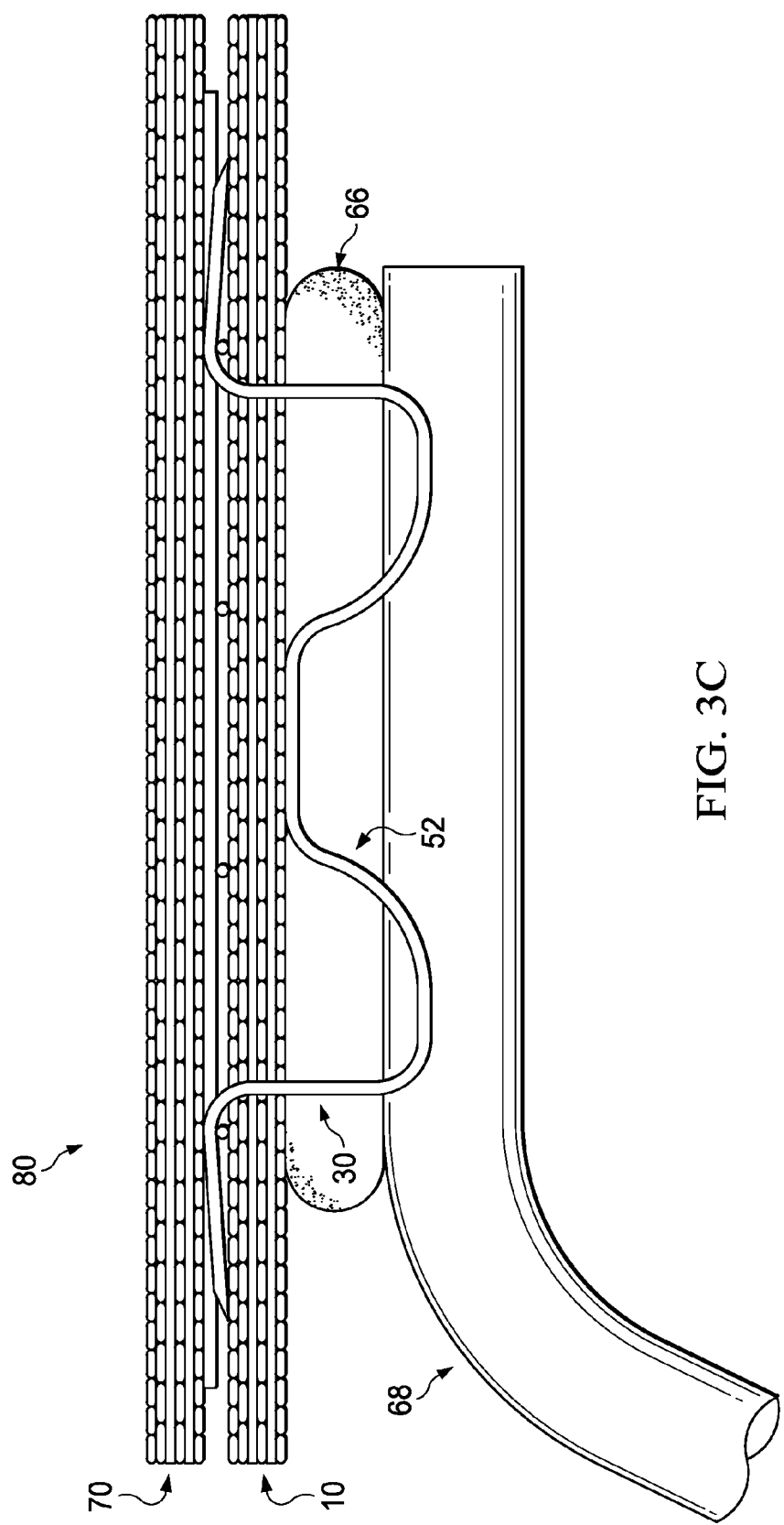

In one embodiment, a portion of the staple 30, or more particularly at least a portion of the crown 52 of the staple 30, can be imbedded into the second body member 68 such as shown in FIG. 3C. The process for imbedding a portion of the staple 30 (e.g., formed from steel) into the second body member 68 (e.g., formed from aluminum) can include applying light pressure to the CFRP part to disperse the adhesive 66 to the proper thickness, in conjunction with another activity, such as one or more of the following to facilitate the imbedding: ultra-sonic joining, localized laser heating of the aluminum and then pressing, and hybrid alloy solution that can place low hardness aluminum in the location of the staple and can use direct compressive pressure or an ultrasonic compressive process to make the joint. In one embodiment, the resin of the composite can be cured with the staple 30 in-situ prior to the imbedding process, but the adhesive 66 can be cured after the imbedding process. The staple 30 can accordingly reinforce the adhesive 66, carry Mode I loads, and help integrate the entire structure together. A completed multi-material joint 80 is shown in FIG. 3C.

Figure 5B:
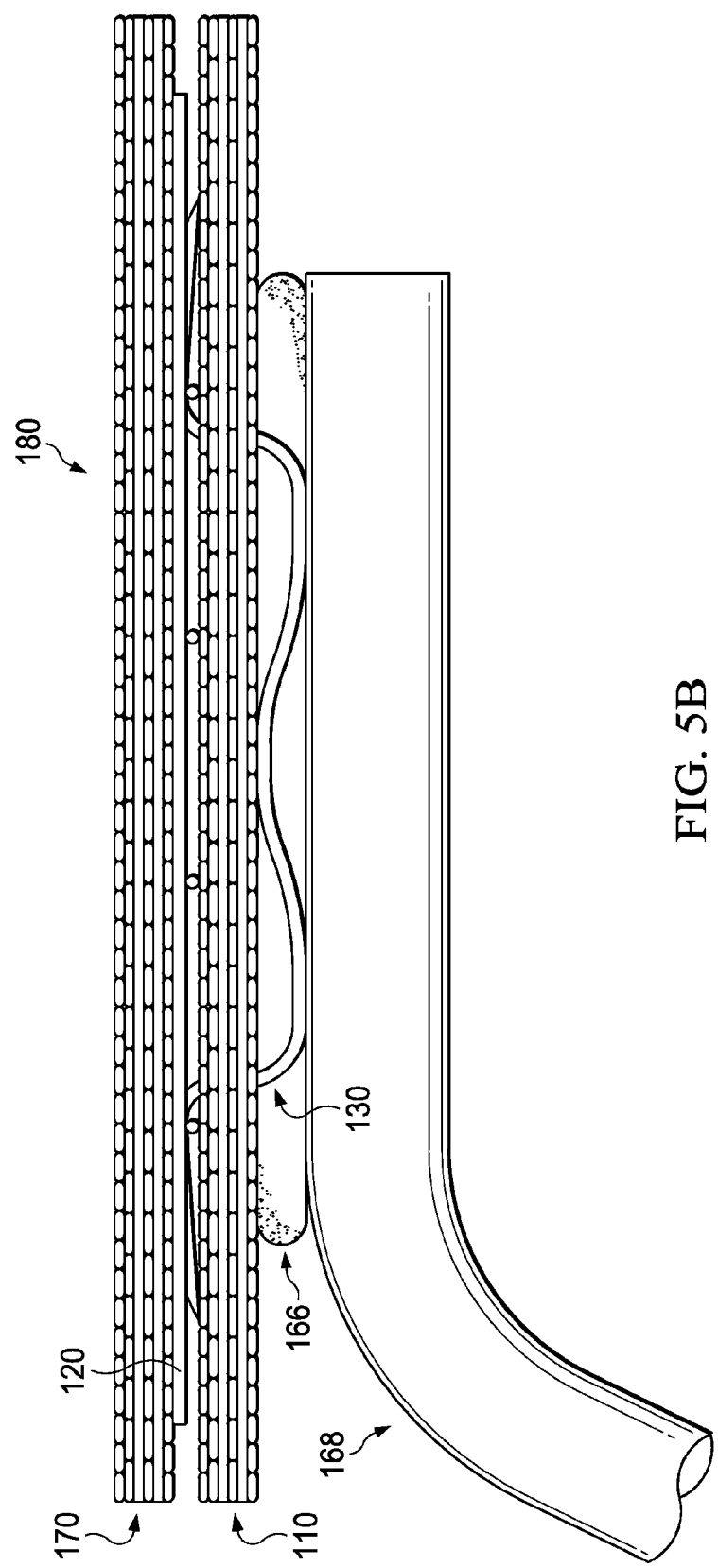

FIGS. 5A-5B depict an arrangement generally similar to that of FIGS. 3A-3B, respectively, but with a staple having a different shape. Select reference numbers are provided to indicate elements like those of FIGS. 1, 2A-2H, and 3A-3C, except preceded by a "1". In the arrangement of FIGS. 5A-5B, adhesive 166 can facilitate attachment of the staple 130 to the second body member 168, without there ever being an imbedding process. For example, after the resin of first and second composite layers 110 and 170 has been cured, the adhesive 166 bonds to the staple 130 which also bonds to the second body member 168 (e.g., formed from aluminum), thus facilitating a multi-material joint 180. In addition to bonding, the staple 130 helps insure a consistent thickness of the adhesive 166. In contrast, as described above, the multi-material joint 80 of FIG. 3C additionally involves imbedding of a portion of the staple 30 into the second body member 68.

The multi-material joints 80, 180 as herein disclosed can accordingly facilitate a high rate metal pinning system capable of locking composite/metal interfaces together while reinforcing them and producing a self-fixturing joint. This can allow the adhesive to fully cure in subsequent manufacturing operations, while also maintaining a constant bondline thickness. High strength fibers can thus be directly or indirectly connected with an aluminum substrate by using steel wires which are integrated into the fiber preform prior to resin impregnation.

Figure 7:
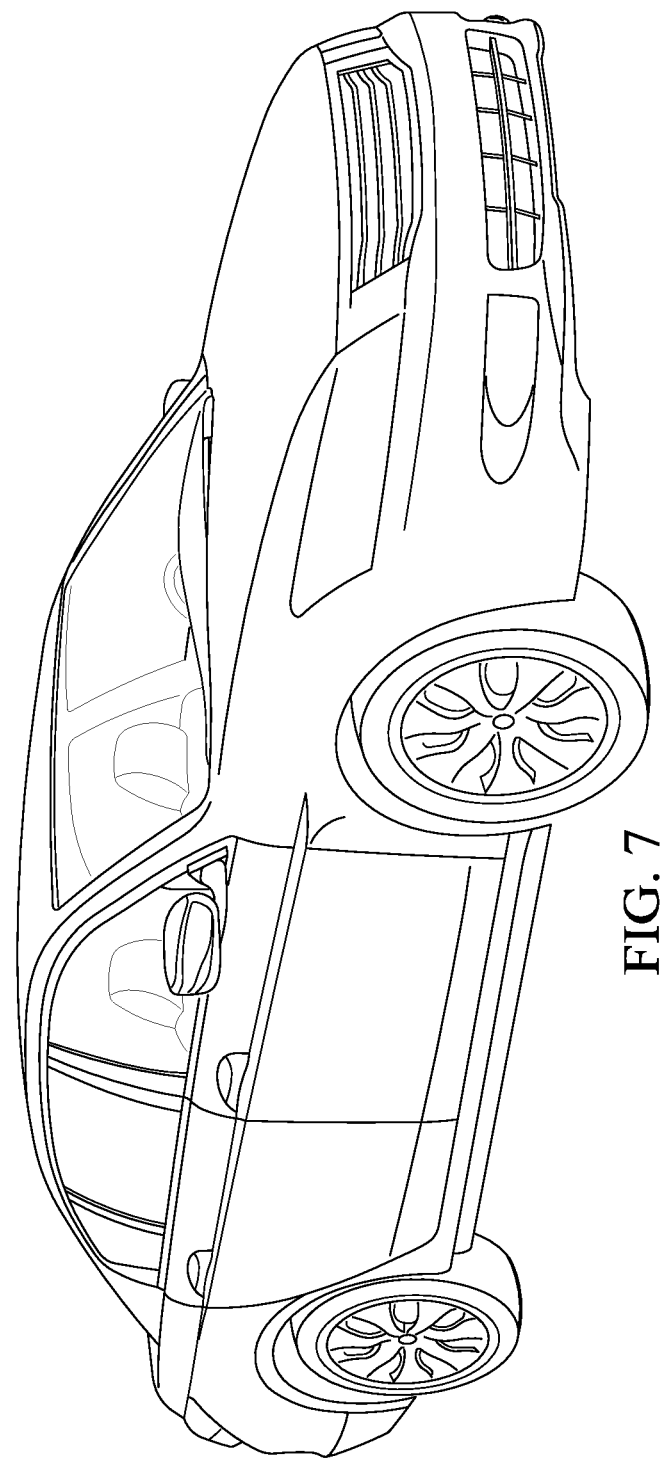
FIG. 7 is a perspective view depicting a vehicle in which one or more components, such as interior or exterior body panels, can include one or more multi-material joints.

It will therefore be appreciated that the multi-material joints 80, 180 can facilitate effective constraint or attachment of dissimilar materials, e.g., a CFRP layer to aluminum layers. In some embodiments, several multi-material joints 80, 180 can be provided in close proximity to one another, e.g., only a few millimeters apart, in tight clusters, or uniformly distributed. Functional strength requirements can dictate assembly placement, with increased density of staples per unit area providing increased strength. Anisotropic joint characteristics can affect desired orientation of the staple 30, 130 relative to other components of the multi-material joints 80, 180. FIG. 7 illustrates a vehicle in which one or more components, such as interior or exterior body panels, can include one or more multi-material joints 80, 180.

Figure 6A:
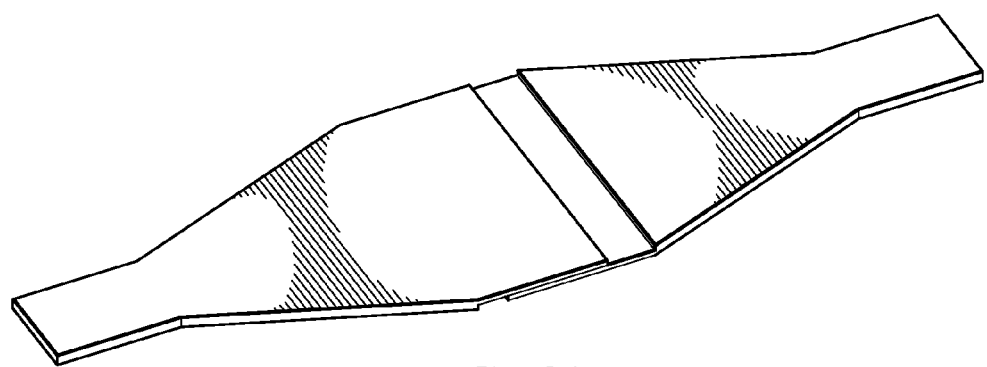
FIG. 6A is a perspective view depicting a super lap shear test coupon or specimen of a composite-to-metal type.
Figure 6B:
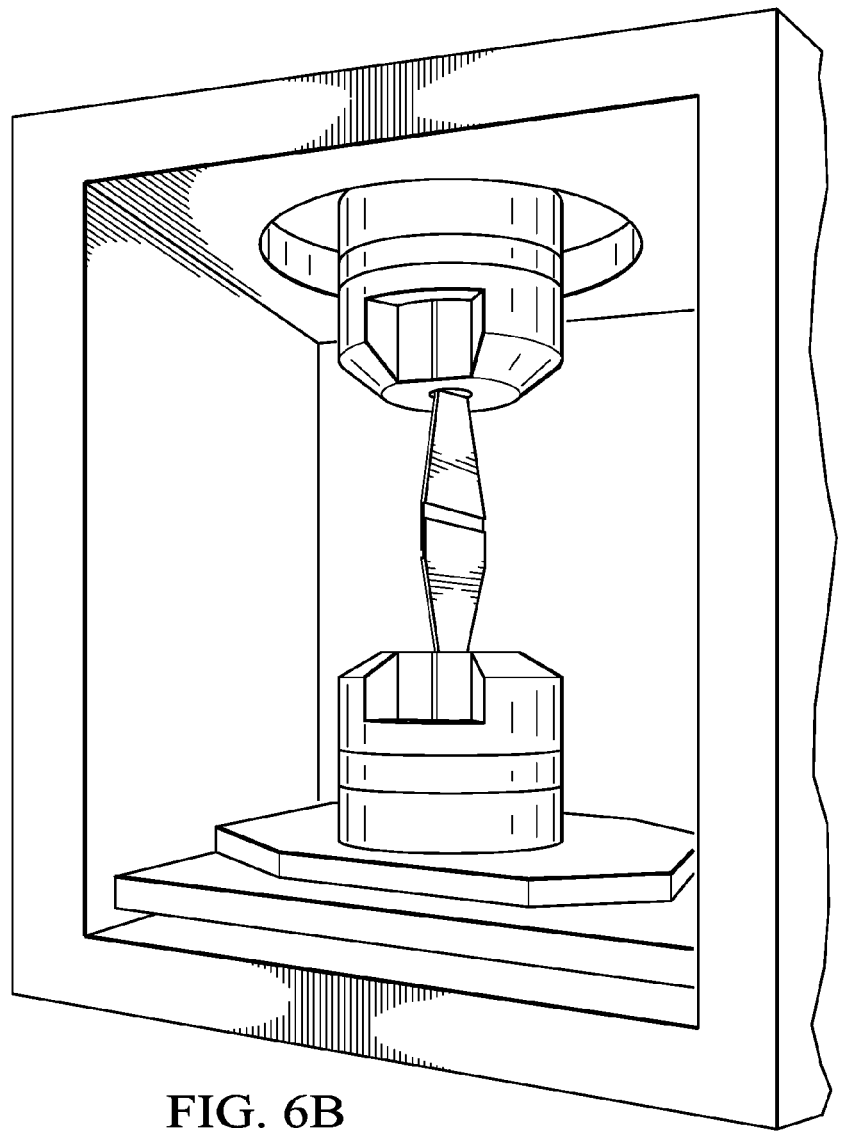
FIG. 6B is a perspective view depicting a mechanical test machine and oven which can be used for quasi-static and dynamic testing of the specimen of FIG. 6A.
Figure 6C:
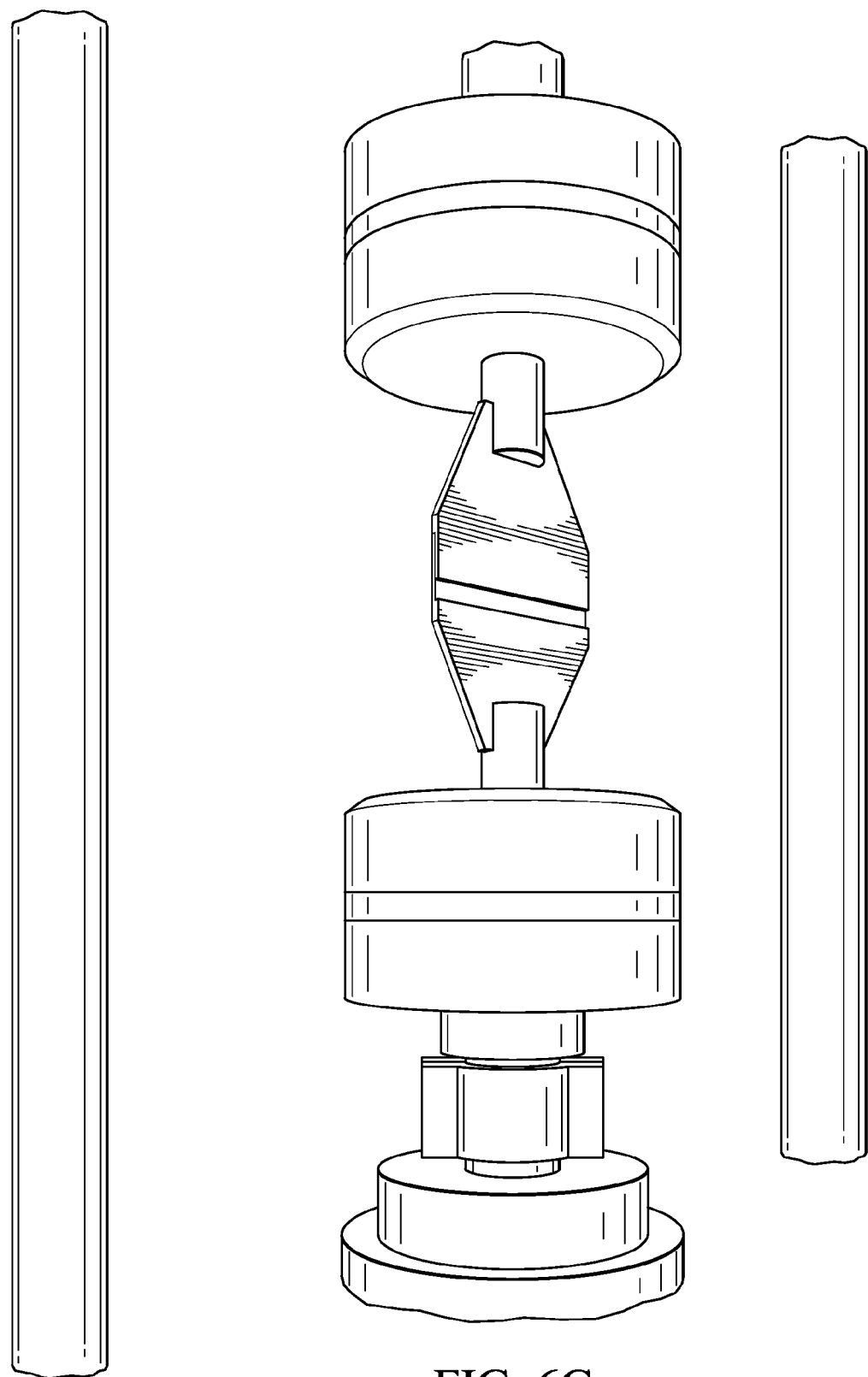
FIG. 6C is a perspective view depicting an Axial-Torsional test machine which can be used for quasi-static torsion dynamic testing of the specimen of FIG. 6A.

FIG. 6A illustrates a super lap shear test coupon or specimen of a composite-to-metal type that can be used with a mechanical test machine and oven, such as that of FIG. 6B, to allow for quasi-static and dynamic testing of the multi-material joint at elevated temperatures. In addition, quasi-static torsion tests can be conducted with composite-to-metal specimens using an MTS Axial-Torsional test machine such as shown in FIG. 6C. Based on the results of this testing and corrosion evaluation, process parameters for both the staple inclusion and the adhesive bonding operations can be optimized.

Any of a variety of suitable staple geometries, installation patterns, and installation parameters (speed, force, etc.) can be selected to facilitate optimal use with other components of a multi-material joint. It will be appreciated that the configuration of the staple can be altered as appropriate in order to attain suitability of the staple for use with different types of layers, such as to prevent damage to the layers upon insertion of the staple through the layers. It will also be appreciated that corrosion of the staple can be prevented through appropriate selection of suitable materials forming the staple, and/or through coating the staple. Corrosion can additionally or alternatively be prevented by coating the second body member. The configuration of a multi-material joint can be selected in response to evaluation of quasi-static tensile, flexure, fatigue and creep loadings for the joint; issues arising from combining dissimilar materials; accelerated corrosion tests; assessment of damage to the composite due to the stapling process; and galvanic corrosion of dissimilar materials.

The multi-material joints 80, 180 can provide several advantages over conventional adhesive methods for joining or bonding dissimilar materials. Both of the multi-material joints 80, 180 can establish more efficient load transfer between high strength fibers and aluminum or other metal, while avoiding or minimizing fiber damage, thus improving overall efficiency of the joints. Integration of a staple into the fabric layout of the FRP reduces or eliminates the damage to the fabric. Furthermore, such as by having a reinforced adhesive joint and a stiffened composite structure, multi-material joints 80, 180 can be at least 20% stronger than conventional joints, with additional bending stiffness in the composite. Not only can the multi-material joints 80, 180 be used for joining carbon fiber composite and aluminum automotive components, but they can also be used for joining other metal-composite material pairs such as carbon fiber composites with high strength steel, magnesium systems, and other metal systems, for example, in use, or as candidates for use, in automotive or other applications. As a result, it is applicable across a range of lightweight materials and for a variety of potential automotive and other joint geometries.

Joining dissimilar materials is an important technical barrier to weight reduction of both civilian and military vehicles. Improvement in the strength of metal-composite joints can allow for both aluminum and carbon fiber composites to be used in more applications. For example, implementation of the multi-material joints 80, 180 can allow for the use of lightweight metals and composites to a greater degree in high volume passenger, commercial, and military vehicle platforms, which can increase the fuel economy of those vehicles. This technology can facilitate more effective incorporation of low mass materials in future vehicles on a large scale. Aluminum can yield a mass reduction of 30-50% when used to replace steel structures and carbon fiber composites can yield mass reductions of 40-60% when replacing steel structures. For every 10% reduction in vehicle mass, a drop of 5-8% in fuel consumption can be realized. By enabling wider spread use of light metals and carbon fiber composites, significant petroleum usage reduction can be achieved.

Use of the multi-material joints 80, 180 can also facilitate joining of CFRP with metal via a high rate pinning process that can be easily incorporated in high volume automotive plants at minimum cost, thus providing manufacturing and cost efficiencies, and overcoming some of the reliability and manufacturability obstacles common with typical adhesive bonding of composites to dissimilar materials. The technology uses low cost materials (e.g., wires and staples) that can be accomplished using industry standard robots and automation technology already in use by automotive manufacturers, and industry acceptable tools and processes with little specialized training, and is therefore economically viable for the automotive industry.

The multi-material joints 80, 180 can overcome other disadvantages of conventional approaches in joining dissimilar materials. The ultimate goal in structural joining is to "connect" structurally significant materials in an efficient way. While current bonding methods can be effective in compressive and shear load cases, they can be ineffective in tensile or peel loading. Conventional methods have disadvantages related to fiber damage or poor connectivity due to bonding to the resin rather than directly to the high strength fiber.

For example, current methods for joining metal and CFRP panels involve classic methods like bolting, riveting, and bonding. Bolting and riveting destroy continuous fibers by making holes in the composite material. Conventional bonding techniques do not effectively join the high strength fibers to the high strength metal. Recent methods still in the research phase involve screwing, nailing, and sandwiching. Screwing and nailing still involve some degree of fiber and resin matrix damage. Sandwiching is simply a 2-sided version of bonding, which in some cases still involves making a hole in the CFRP panel, which compromises CFRP material integrity.

Adhesive bonding is another conventional method by which carbon fiber composites are joined to metallic material systems. This introduces several difficulties for forming joints at the speeds required by the automotive manufacturing environment and produces difficulties in service loads encountered by automotive structures. For example, an adhesive/composite resin bond and an adhesive/metal bond are normally sharply contrasting interfaces which are weakest in Mode I "peel" loading, and thus care is typically required in design to avoid such loading. Also, maintaining a constant, predictable bondline thickness is likewise important to joint performance, and adhesives tend to bond to the resin rich surface layer of the composite rather than to the more robust fiber reinforcement. As a result, adhesive bonding requires a significant amount of both time and fixturing to join parts in an assembly plant, which can result in increased manufacturing costs. Various approaches have been tried to reduce cure cycle time but fell short of reaching high volume (>200,000 units/year) implementation in structural applications.

Additionally, conventional FRP and CFRP components are joined with aluminum components using a variety of methods including polyurethane bonding, mechanical riveting, and bolting. Bonding does not efficiently connect the high strength fibers of the FRP with the aluminum. Failure modes in peel or tensile loading occur due to the resin matrix fracturing at the resin/fiber interface. Mechanical joining like rivets or bolting can cause significant damage to the high strength fibers either by piercing/drilling holes through the fibers or by tearing through the fibers. Tearing fibers is more destructive to FRP materials because it can pull fibers out of the local resin matrix, causing damage to the local matrix and further reducing strength of the local FRP material. The following are hereby incorporated herein in their entireties:

(1) Warren, C. D., Boeman, R. G., and Paulauskas, F. L., "Adhesive Bonding of Polymeric Materials for Automotive Applications," Presented at and published in *Proceeds of the* 1994 *DOE Contractors Coordination Meeting Conference*. Detroit, Mich., Vol. 2, 24-27 Oct. (1994).

(2) Paulauskas, F. L., McMillan, A. D., and Warren, C. D., "Adhesive Bonding Via Exposure to Variable Frequency Microwave Radiation," presented and published in *Proceeds of the Spring Materials Research Society* (*MRS*), San Francisco, Calif., 8-12 Apr. (1996).

(3) Warren, C. D. and Boman, R. G., "Adhesive Bonding of Polymeric Materials for Automotive Applications," Presented at and published in *Proceeds of the* 1994 *DOE Contractors Coordination Meeting Conference*. Detroit, Mich., Vol. 2, 24-27 Oct. (1994).

(4) Warren, C. D. and Boeman, R. G., "DOE Automotive Composite Materials Research: Present and Future Efforts," presented and published in *Proceedings of the Composites '99 Manufacturing and Tooling Conference*, Anaheim, Calif., February (1999).

(5) Warren, C. D., "Carbon Fiber in the Next Generation of Vehicles", Proceedings of *The Global Outlook for Carbon Fiber* 2000, Intertech, San Antonio, Tex., 4-6 Dec. (2000).

(6) Warren, C. D., "Carbon Fiber in Future Vehicles", *Sampe Journal*, Vol. 37, No. 2, March/April 2001.

(7) Warren, C. D. "The Development of Lightweight, High Strength Materials for Fuel Efficient Vehicles", *The Global Outlook for Carbon Fiber* 2005, San Diego, Calif., 11-13 Oct. (2005).

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A multi-material joint comprising:
    a first body member comprising a first layer of fiber reinforced material, the first layer of fiber reinforced material having a first upper surface and a first lower surface;
    a second body member comprising a metal;
    a staple, the staple comprising a first prong, a second prong, and a crown joining the first and second prongs, wherein the first and second prongs are inserted through the first layer of fiber reinforced material such that the crown is positioned adjacent to the first upper surface;
    a wire ladder positioned adjacent to the first lower surface and comprising first and second rails coupled together by a plurality of rungs, wherein the first and second prongs of the staple hook over the respective first and second rungs of the wire ladder; and
    an adhesive positioned between the first body member and the second body member, the adhesive covering at least a portion of the crown of the staple.

2. The multi-material joint of claim 1, wherein the first body member further comprises a second layer of fiber reinforced material, the second layer of fiber reinforced material has a second upper surface and a second lower surface, and the second upper surface is adjacent to the wire ladder, such that the wire ladder and end portions of the respective first and second prongs are sandwiched between the first and second layers of fiber reinforced material.

3. The multi-material joint of claim 1, wherein the fiber reinforced material comprises a carbon fiber reinforced material.

4. The multi-material joint of claim 1, wherein the fiber reinforced material comprises a fiber reinforced plastic.

5. The multi-material joint of claim 1, wherein the fiber reinforced material is substantially encapsulated by a matrix material.

6. The multi-material joint of claim 5, wherein the matrix material comprises an epoxy resin.

7. The multi-material joint of claim 1, wherein the metal comprises a metal alloy.

8. The multi-material joint of claim 1, wherein the metal of the second body member comprises aluminum.

9. The multi-material joint of claim 8, wherein the fiber reinforced material comprises a carbon fiber reinforced plastic.

10. The multi-material joint of claim 1, wherein the first and second prongs are substantially parallel with one another when the staple is in an unfastened configuration.

11. The multi-material joint of claim 1, wherein the first prong comprises a first prong end, the second prong comprises a second prong end, and each of the first and second prong ends are beveled.

12. The multi-material joint of claim 1, wherein the first prong, and the second prong, and the crown are formed together as a unitary structure.

13. The multi-material joint of claim 12, wherein the staple is formed from metal.

14. The multi-material joint of claim 12, wherein staple is formed from a metal alloy.

15. The multi-material joint of claim 12 further comprising a coating on the staple.

16. The multi-material joint of claim 1 further comprising a coating on at least one of the first prong, the second prong, and the crown.

17. The multi-material joint of claim 1, further comprising a plurality of staples.

18. A vehicle comprising the multi-material joint of claim 1.

19. A vehicle comprising a plurality of the multi-material joints of claim 1.

20. The multi-material joint of claim 1, wherein at least a portion of the crown of the staple is imbedded into the second body member.

21. The multi-material joint of claim 1, wherein the crown of the staple is deflected such that a central portion of the crown is in contact with an upper surface of the first layer of fiber reinforced material and side portions of the crown are spaced from the upper surface of the first layer of fiber reinforced material.

22. A method of making a multi-material joint, the method comprising:
    piercing a first layer of fiber reinforced material of a first body member with a staple, such that first and second prongs of the staple pass through the first layer, and such that a crown of the staple joining the first and second prongs is positioned adjacent to an upper surface of the first layer;
    positioning a wire ladder adjacent to a lower surface of the first layer of fiber reinforced material, the wire ladder comprising first and second rails coupled together by a plurality of rungs;
    bending end portions of the first and second prongs of the staple to hook over the respective first and second rungs of the wire ladder; and
    positioning an adhesive between the first layer and a second body member, such that the adhesive covers at least a portion of the crown of the staple, wherein the second body member comprises a metal.

23. The method of claim 22 further comprising imbedding at least a portion of the staple into the second body member.

24. The method of claim 23, further comprising curing the adhesive after the imbedding.

25. The method of claim 22 further comprising positioning a second layer of fiber reinforced material of the first body member adjacent to the wire ladder such that the wire ladder and the end portions of the first and second prongs of the staple are sandwiched between the first and second layers of fiber reinforced material.

26. The method of claim 22, wherein the fiber reinforced material is carbon fiber reinforced plastic and the second body member is aluminum.

27. The method of claim 22, further comprising substantially encapsulating the fiber reinforced material with a matrix material.

28. The method of claim 27, wherein the matrix material comprises an epoxy resin.

29. The method of claim 22, further comprising a plurality of the staples.

30. The method of claim 22, wherein: a die contacts the crown to facilitate bending of the end portions to hook over the respective first and second rungs such that the first and second prongs are spaced from the respective first and second rungs; and the crown of the staple is deflected by the die, such that upon removal of the die, the first and second prongs contact the respective first and second rungs.

31. The method of claim 30, wherein upon removal of the die, the crown of the staple is deflected such that a central portion of the crown contacts the upper surface of the first layer, and such that side portions of the crown are spaced from the upper surface of the first layer.

32. The method of claim 22, further comprising coating the staple.

33. The method of claim 22, wherein the metal comprises a metal alloy.

34. The method of claim 22, further comprising beveling the first and second prong ends.

35. The method of claim 22, wherein the first prong, the second prong, and the crown are formed together as a unitary structure.

36. A multi-material joint comprising:
a first body member comprising a first layer of fiber reinforced material, the first body member having a first surface and a second surface opposite the first surface;
a second body member comprising a metal and positioned opposite the first surface of the first body member;
a reinforcement member positioned adjacent the second surface of the first body member, wherein the reinforcement member is a wire ladder comprising first and second rails coupled together by a plurality of rungs;
a fastener body positioned between the first body member and the second body member to maintain a gap therebetween, the fastener body including a first leg and a second leg each extending therefrom and through the first body member and the reinforcement member, the first and second legs being configured to position at least a portion of the reinforcement member between the first body member and the first and second legs, wherein the first and second legs hook over the respective first and second rungs of the wire ladder; and
an adhesive positioned in the gap between the first body member and the second body member and contacting at least a portion of the fastener body.

37. The multi-material joint of claim 36 wherein a first portion of the fastener body engages the second body member, and a second portion of the fastener body extends from the first portion to engage the first body member.

* * * * *